United States Patent
Tsuboi et al.

(10) Patent No.: US 6,591,929 B1
(45) Date of Patent: Jul. 15, 2003

(54) MOTOR-ASSISTED BICYCLE AND POWER UNIT

(75) Inventors: Masaharu Tsuboi, Saitama (JP); Seishi Miura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/577,567

(22) Filed: May 25, 2000

(30) Foreign Application Priority Data

May 25, 1999 (JP) .......................................... 11-145669
May 25, 1999 (JP) .......................................... 11-145670

(51) Int. Cl.[7] ............................................. B63K 11/00
(52) U.S. Cl. ...................................... 180/205; 180/220
(58) Field of Search ................................. 180/205, 207, 180/220, 226, 65.1, 65.2, 214, 216

(56) References Cited

U.S. PATENT DOCUMENTS

| | | | | |
|---|---|---|---|---|
| 4,085,814 A | * | 4/1978 | Davidson et al. ............. | 180/33 |
| 5,758,736 A | * | 6/1998 | Yamauchi .................... | 180/220 |
| 5,826,675 A | * | 10/1998 | Yamamoto .................... | 180/220 |
| 5,941,333 A | * | 8/1999 | Sun et al. .................... | 180/206 |
| 6,016,882 A | * | 1/2000 | Ishikawa .................... | 180/205 |
| 6,073,717 A | * | 6/2000 | Yamamoto et al. .......... | 180/205 |
| 6,119,801 A | * | 9/2000 | Yamashita et al. .......... | 180/205 |

FOREIGN PATENT DOCUMENTS

| | | | | |
|---|---|---|---|---|
| DK | 93167 | * | 6/1962 | ................ 180/205 |
| JP | A4833175 | | 10/1973 | |

* cited by examiner

Primary Examiner—Lesley D. Morris
Assistant Examiner—Tony Winner
(74) Attorney, Agent, or Firm—Birch, Stewart, Kolasch & Birch, LLP

(57) ABSTRACT

A motor-assisted bicycle and a power unit therefor in which the power unit is after-mounted on an existing bicycle frame without largely changing the design of the bicycle frame so that an assist power generated from the power unit is input into a chain drive. A power unit is formed with at least three boss forming spaces for forming bosses to be fixed to a bicycle frame. The power unit is fixed to the bicycle frame by selectively using any two of the bosses. The bicycle frame has a support pipe and a down pipe to which flanges are fixed, respectively. The two bosses of the power unit are bolted to the flanges, respectively, thereby fixing the power unit to the bicycle frame. In addition, a motor-assisted bicycle is provided having a chain cover for functionally covering a drive sprocket of a power unit together with a pedal sprocket and a chain without marring the appearance. An integral chain cover is composed of a drive sprocket cover portion for mainly covering a drive sprocket, a chain cover portion for mainly covering a stretched portion of a chain, and a pedal sprocket cover portion for mainly covering an upper half of a pedal sprocket. The drive sprocket cover portion for covering the drive sprocket is formed as a circular portion subjected to coloring and surface roughening so as to correspond to the outside shape of the drive sprocket, and this circular portion is positively utilized as a kind of ornament.

14 Claims, 22 Drawing Sheets

MOTOR-ASSISTED BICYCLE AND POWER UNIT

BACKGROUND OF THE INVENTION

1. Field of the Invention

The present invention relates to a motor-assisted bicycle and a power unit therefor, and more particularly to a motor-assisted bicycle and a power unit therefor in which the power unit is after-mounted on an existing bicycle frame without largely changing the design of the bicycle frame so that an assist power generated from the power unit is input into a chain line.

2. Description of Background Art

For widespread use of a motor-assisted bicycle, it is desirable to manufacture a versatile and inexpensive motor-assisted bicycle by after-mounting a power unit and a battery on an existing bicycle frame without largely changing the design of the bicycle frame. For example, Japanese Utility Model Publication No. 48-33175 discloses such a motor-assisted bicycle that a power unit is after-mounted on an existing bicycle frame without largely changing the design of the bicycle frame and that an assist power generated from the power unit is input into a chain line.

In the prior art mentioned above, the bicycle is designed and manufactured so that the power unit is intended to be after-mounted. That is, the power unit to be after-mounted is specific to the bicycle. Thus, no consideration is given to the versatility so that a common power unit can be after-mounted on the bicycle frames of various bicycles without largely changing the design of each bicycle frame.

In the case of inputting the assist power into the chain line, a drive sprocket of the power unit must be located so as to mesh with a chain at any position on the chain line. However, the bicycle frames have various sizes and structures, so that there is a case that the position of inputting the assist power through the drive sprocket into the chain may be limited to the front side of a crankshaft or to the rear side of the crankshaft, depending on the sizes and structures of the bicycle frames. Accordingly, a common power unit cannot be used for the various bicycle frames. As a result, in the case of newly planning a motor-assisted bicycle, a bicycle frame itself of this bicycle must be newly redesigned, causing a low versatility.

In the case of inputting the assist power into the chain line, the drive sprocket of the power unit must be located so as to mesh with a chain at any position on the chain line. Accordingly, a chain cover must be provided so as to cover both the pedal sprocket and the drive sprocket, so that a conventional chain cover cannot be used as it is. However, no consideration is given to a chain cover in the prior art mentioned above.

SUMMARY AND OBJECTS OF THE INVENTION

It is accordingly an object of the present invention to provide a motor-assisted bicycle having a chain cover for functionally covering the drive sprocket of the power unit together with the pedal sprocket and the chain without marring the appearance.

It is accordingly an object of the present invention to provide a motor-assisted bicycle which can be configured by after-mounting a common power unit on an existing bicycle frame without largely changing the design of the bicycle frame regardless of the type of bicycle frame. It is another object of the present invention to provide such a power unit.

In accordance with the present invention, there is provided in a motor-assisted bicycle having a power unit for inputting an assist power into a chain according to a depression force input from a pedal into said chain, the improvement comprising a bicycle frame having a plurality of flanges for fixing said power unit; said power unit having a plurality of boss forming spaces for forming bosses to be fixed to said bicycle frame, said bosses being selectively formed in at least a part of said boss forming spaces; and means for fixedly connecting said bosses of said power unit to said flanges of said bicycle frame, respectively; wherein the positions of said flanges on said bicycle frame and the positions of said boss forming spaces where said bosses are selectively formed are specific according to variations in kind of said bicycle frame.

With this arrangement, the positions of the plural flanges on the bicycle frame are specific according to variations in kind of the bicycle frame, and the positions of the boss forming spaces where the bosses are selectively formed are also specific according to variations in kind of the bicycle frame. Accordingly, the power unit can be mounted at specific positions on the bicycle frame with specific attitudes according to the kinds of the bicycle frame. Thus, the power unit can be commonly used for different kinds of bicycle frames.

In accordance with the present invention, there is provided in a motor-assisted bicycle having a power unit for inputting an assist power into a chain according to a depression force input through a crankshaft into said chain, the improvement comprising a pedal sprocket mounted on said crankshaft and meshing with said chain; a drive sprocket mounted on an output shaft of said power unit and meshing with said chain; and a chain cover for covering said pedal sprocket and at least a part of a stretched portion of said chain; wherein said chain cover is integrally formed with a drive sprocket cover portion for covering said drive sprocket.

With this arrangement, all of the pedal sprocket, the stretched portion of the chain, and the drive sprocket can be covered with the single chain cover. Accordingly, it is possible to provide a motor-assisted bicycle having a chain cover capable of sufficiently exhibiting the function for the motor-assisted bicycle without an increase in the number of parts.

Furthermore, since the drive sprocket cover portion is integral with the chain cover, the overall shape and color of the chain cover including the drive sprocket cover portion can be made uniform, so that the appearance is not marred in spite of the presence of the drive sprocket cover portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
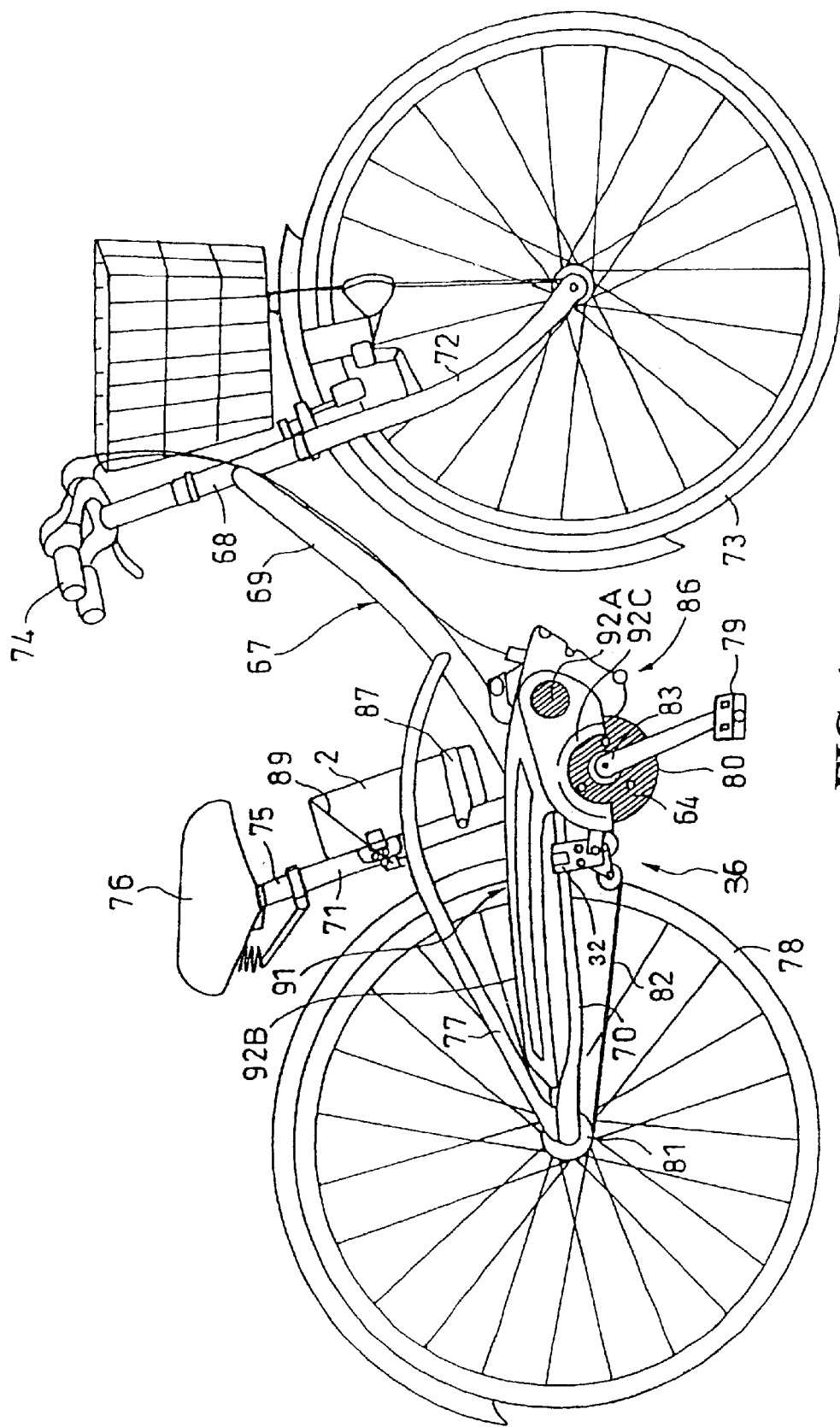
FIG. 1 is a side view of a motor-assisted bicycle (F/F structure) according to a first preferred embodiment of the present invention.

Some preferred embodiments of the present invention will now be described in detail with reference to the drawings. FIG. 1 is a side view of a motor-assisted bicycle according to a first preferred embodiment of the present invention. The motor-assisted bicycle shown in FIG. 1 has an F/F structure such that a battery 2 is mounted on the front side (F) of a seat post 71 and the assist power generated by a power unit 86 is input into a chain line at a position on the front side (F) of a crankshaft 83.

Figure 2:
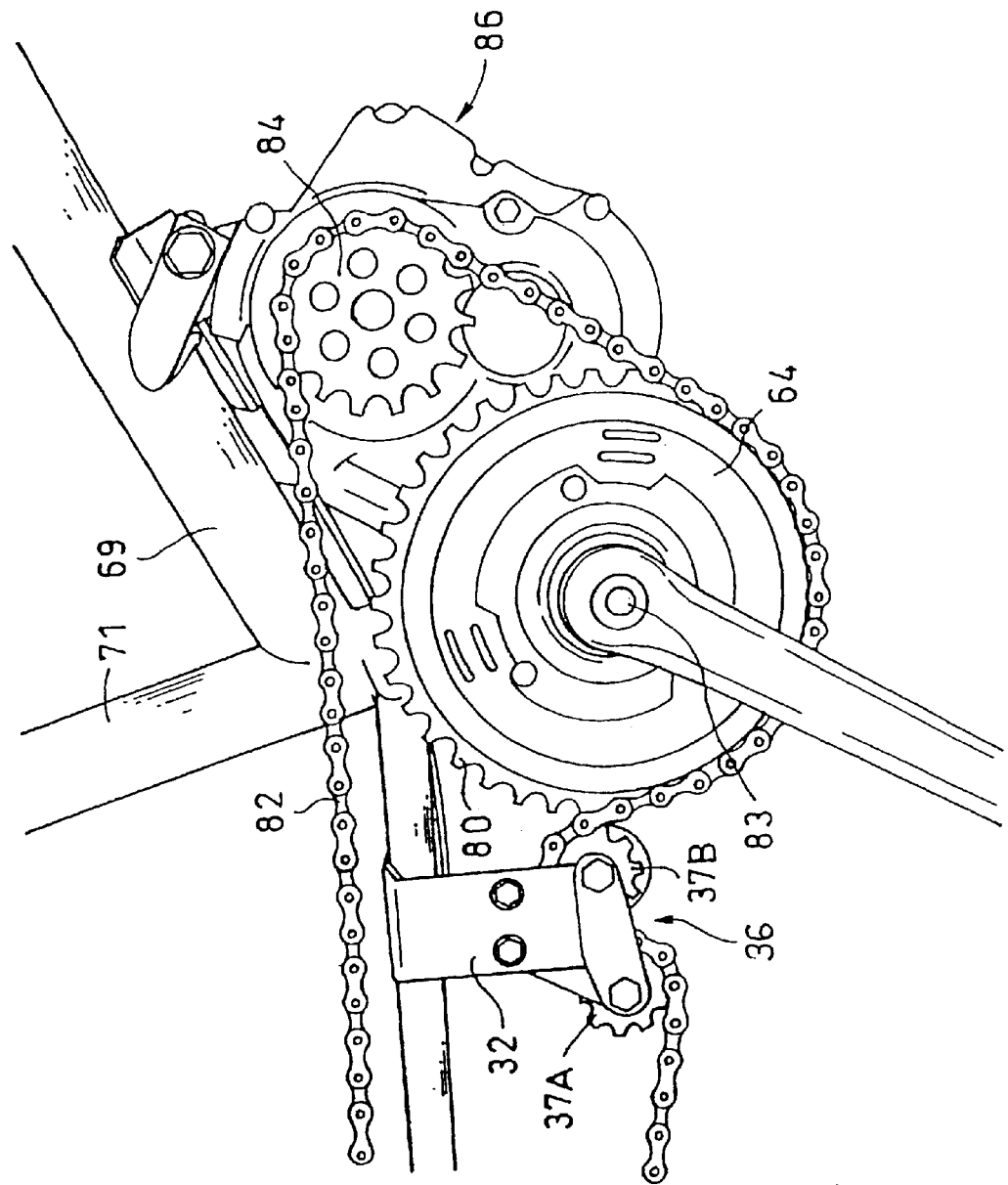
FIG. 2 is an enlarged side view showing the positional relation between a pedal sprocket and a drive sprocket in the motor-assisted bicycle shown in FIG. 1.
Figure 3:
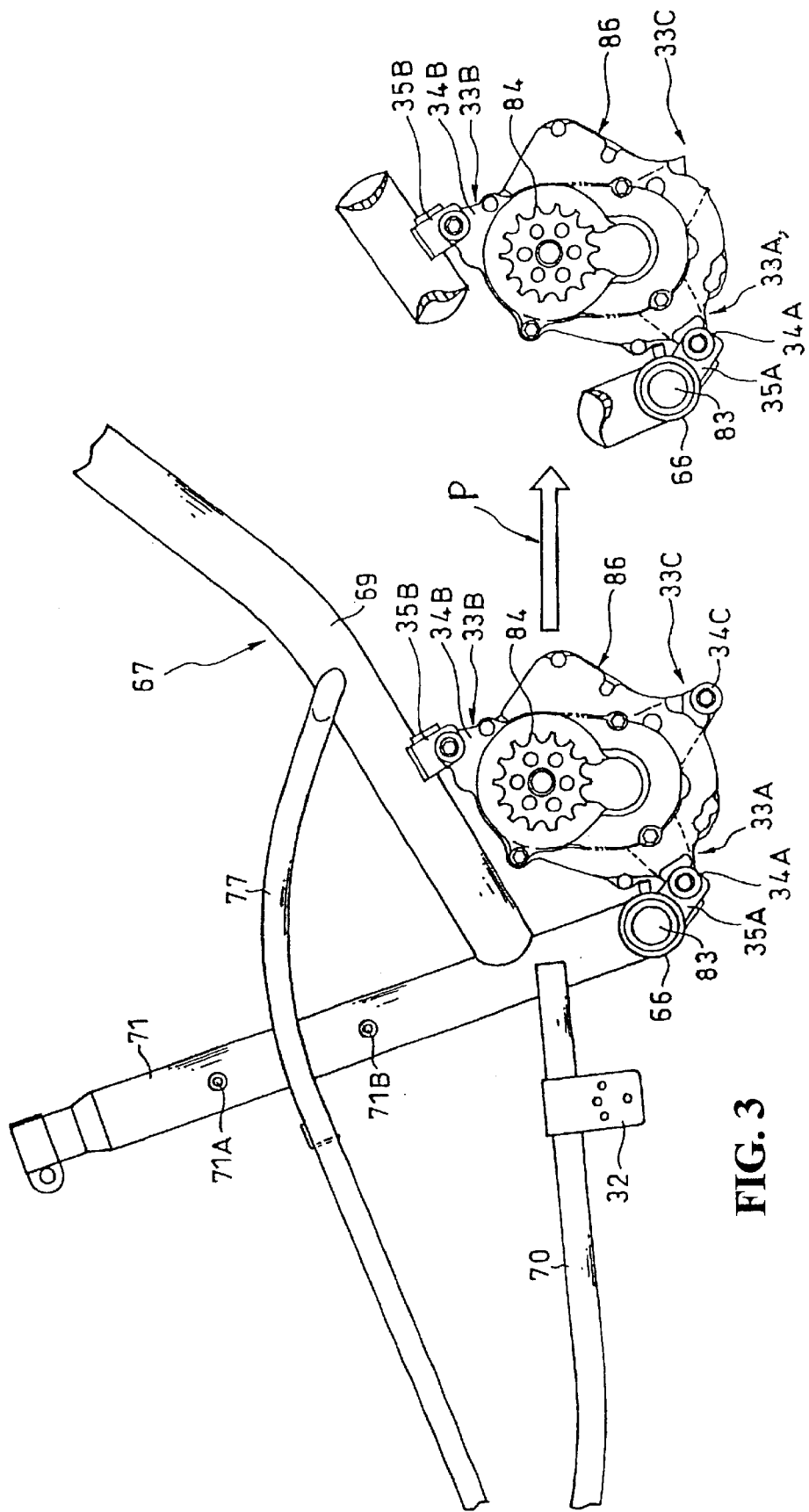
FIG. 3 is an enlarged side view showing a mounting structure of a power unit to a bicycle frame in the motor-assisted bicycle shown in FIG. 1.

FIG. 2 is an enlarged side view of a portion of the motor-assisted bicycle shown in FIG. 1 on the periphery of the crankshaft 83 in the condition where a chain cover 91 is removed, and FIG. 3 is a similar side view showing a fixing method for the power unit 86 to a bicycle frame 67.

The bicycle frame 67 in this preferred embodiment is an existing frame designed and manufactured for a usual bicycle. That is, the bicycle frame 67 includes a head pipe 68 forming a front end, a down pipe 69 extending rearward so as to be inclined downward from the head pipe 68, a support pipe 66 (see FIG. 3) fixed to the rear end of the down pipe 69 and extending in the lateral direction of the bicycle, and a seat post 71 extending upward from the support pipe 66.

A front fork 72 is steerably supported to the head pipe 68, and a front wheel 73 is rotatably supported to the lower ends of the front fork 72. A steering handle 74 is provided at the upper end of the front fork 72. A pair of right and left rear forks. 70 extend rearward from the seat post 71, and a rear wheel 78 as a drive wheel is rotatably supported to the rear ends of the rear forks 70. A pair of right left stays 77 extend from the rear ends of the rear forks 70 through the seat post 71 to the down pipe 69. A support shaft 75 having an upper end supporting a seat 76 is fitted with the seat post 71 so that the vertical position of the seat 76 can be adjusted.

A battery 2 for supplying an electric power to the power unit 86 is detachably mounted by a battery holder 87 to be hereinafter described on the front side of the seat post 71 at a position below the seat 76. The battery holder 87 is fixed to the seat post 71 at two pairs of bosses 71A and 71B, each pair being formed on each lateral side of the seat post 71.

The crankshaft 83 extends coaxially through the support pipe 66 of the bicycle frame 67, and a pair of crank pedals 79 are connected to the right and left ends of the crankshaft 83. A depression force applied to the crank pedals 79 is transmitted to the crankshaft 83, and is then input through a pedal sprocket 80 into an endless chain 82. A sprocket cover 64 having the same color coating as that of the bicycle frame 67 is mounted on the pedal sprocket 80.

The power unit 86 has a mounting structure such that it can be applied to various existing bicycle frames only by slightly machining them. That is, as shown in FIG. 3, the power unit 86 has at least three boss forming spaces 33A, 33B, and 33C for forming bosses 34 (34A, 34B, and 34C) to be fixed to the bicycle frame 67. Any two of the bosses 34 are selectively used according to the structure and shape of a bicycle frame to which the power unit 86 is to be applied, and the selected bosses 34 are fixed to the bicycle frame 67. The boss forming spaces 33A, 33B, and 33C are located so that a phantom triangle is formed by the line segments connecting the boss forming spaces 33A, 33B, and 33C.

The support pipe 66 and the down pipe 69 of the bicycle frame 67 are provided with flanges 35A and 35B, respectively. The flanges 35A and 35B are after-fixed to the bicycle frame 67 by a suitable method such as welding. The power unit 86 is fixed in position and attitude to the bicycle frame 67 by bolting the two bosses 34A and 34B formed at the positions 33A and 33B to the flanges 35A and 35B, respectively, in such a manner that a drive sprocket 84 in the power unit 86 comes into mesh with the chain 82 at a position on the front side of the crankshaft 83.

It is not especially harmful to form the idle boss 34C at the boss forming space 33C of the power unit 86 like the other bosses 34A and 34B as shown in FIG. 3 on the left side of an arrow P. Alternatively, the unrequired boss 34C for fixing of the power unit 86 to the bicycle frame 67 may not be formed at the boss forming space 33C as shown in FIG. 3 on the right side of the arrow P, by selectively forming only the bosses 34A and 34B at the boss forming spaces 33A and 33B, respectively, in casting (or forging, etc.) a case of the power unit 86.

The endless chain 82 is wrapped around the pedal sprocket 80, the drive sprocket 84 in the power unit 86, and a driven sprocket 81 mounted on the axle of the rear wheel 78. A tensioner 36 for applying a tension to the chain 82 is provided between the pedal sprocket 80 and the driven sprocket 81. The tensioner 36 has two sprockets 37A and 37B meshing with the chain 82. The tensioner 36 is bolted to a boss 32 formed on the right rear fork 70 of the bicycle frame 67.

In the above-mentioned structure that the power unit 86 is after-fixed to an existing bicycle frame designed and manufactured for a usual bicycle and the assist power generated by the power unit 86 is input through the drive sprocket 84 to the chain line, not only the pedal sprocket 80 and a stretched portion of the chain 82 extending between the pedal sprocket 80 and the driven sprocket 81, but also the drive sprocket 84 must be covered with a chain cover.

In this preferred embodiment, the chain cover 91 has an integral structure composed of a drive sprocket cover portion 92A for mainly covering the drive sprocket 84, a chain cover portion 92B for mainly covering the stretched portion of the chain 82, and a pedal sprocket cover portion 92C for mainly covering an upper half of the pedal sprocket 80. With this structure, the chain and each sprocket of a motor-assisted bicycle so configured (modified) as to input the assist power into the chain line can be simply and reliably covered without an increase in parts count.

However, in the above covering structure that the single chain cover 91 covers all of the chain 82 and the sprockets 80 and 84, there is a possibility that the shape of the chain cover 91 may be strange as departing from a conventional familiar shape, causing a poor appearance.

To cope with this, the drive sprocket cover portion 92A for covering the drive sprocket 84 is formed as a circular portion subjected to coloring and surface roughening so as to correspond to the outside shape of the drive sprocket 84, and this circular portion is positively utilized as a kind of ornament, thereby improving the above-mentioned poor appearance.

Figure 4:
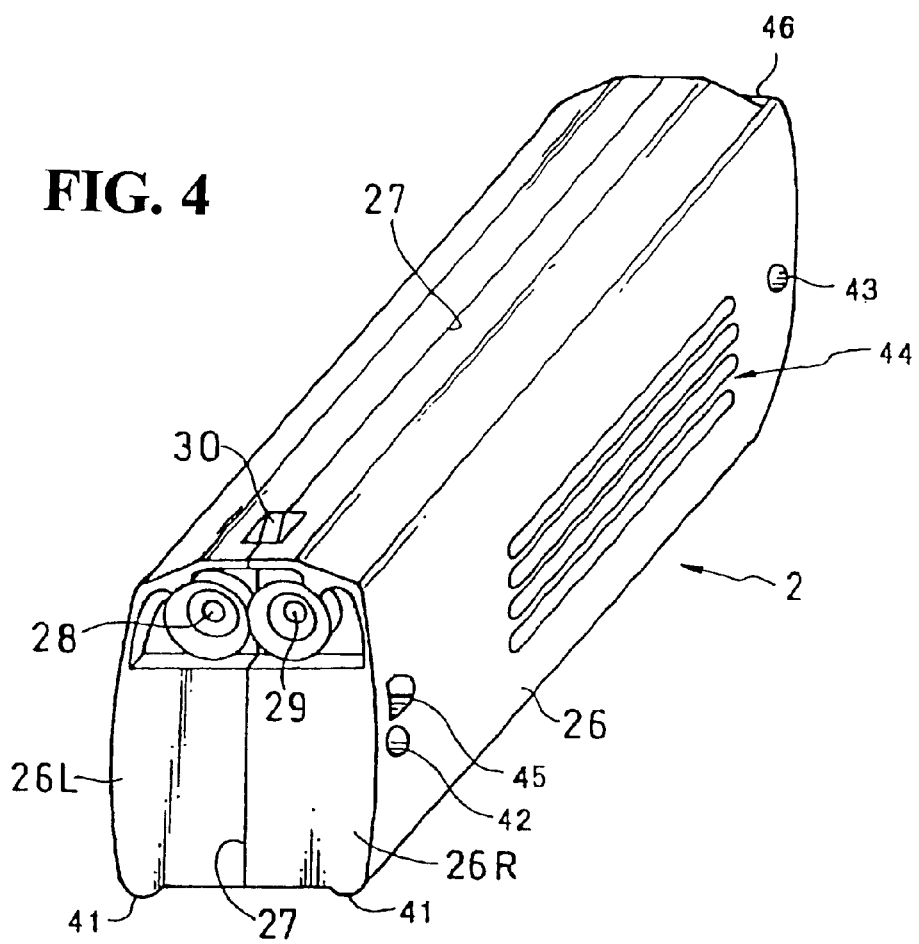
FIG. 4 is a perspective view of a battery.
Figure 5:
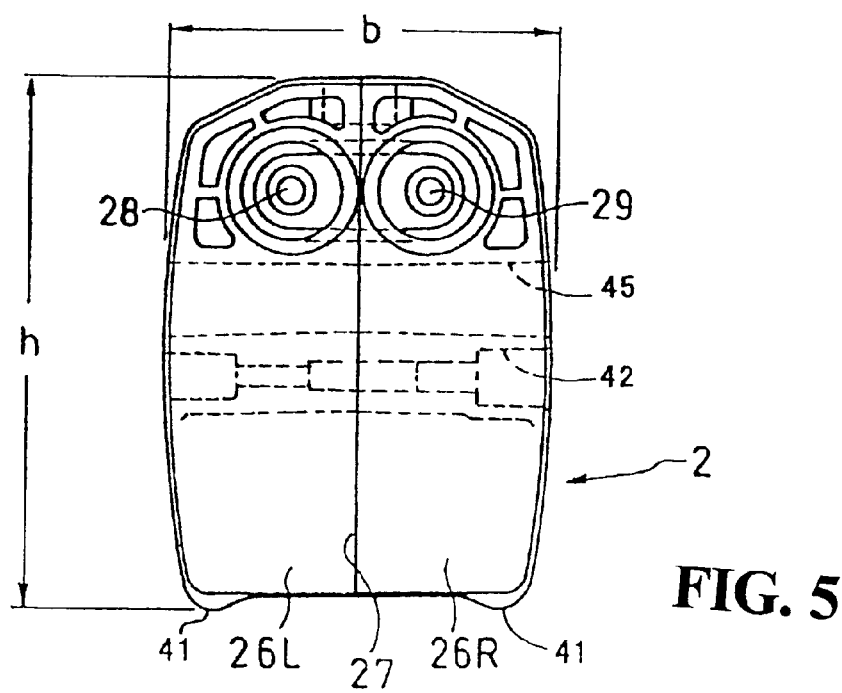
FIG. 5 is a front elevation of the battery.

FIG. 4 is a perspective view of the battery 2, and FIG. 5 is a front elevation of the battery 2. The battery 2 has a plurality of battery cells (not shown) and a substantially rectangular prismatic battery pack 26 accommodating the battery cells. The battery pack 26 is composed of two pack components 26R and 26L facing each other on a surface 27 extending in the longitudinal direction of the battery 2. The pack components 26R and 26L are symmetrical with respect to the surface 27.

A pair of terminals 28 and 29 respectively connected to an anode and a cathode of the unit of the battery cells are exposed to the front surface of the battery 2 in such a manner as to be symmetrical with respect to the surface 27. The top surface of the battery pack 26 near its front end surface is formed with a notch 30 for engaging a locking device provided in a slot 4 to be hereinafter described. Further, the bottom surface of the battery pack 26 along the opposite sides is formed with two parallel ridges 41 extending in the longitudinal direction of the battery 2, so as to ensure both the slidability of the battery 2 on an inner wall of the slot 4 in inserting the battery 2 into the slot 4 and the stability of the battery 2 inserted in the slot 4.

The battery components 26R and 26L can be integrated together by bolts (not shown) engaged into tapped holes 42 and 43. Each side surface of the battery pack 26 is formed with grooves 44 for easy handling of the battery 2, thereby contributing to an improvement in the gripping operation. Further, the size of the battery pack 26 in cross section is set to a so-called palm size so that an operator can easily grip the battery 2. For example, as shown in FIG. 5, the height h is set to about 80 mm and the width b is set to about 55 mm corresponding to the palm size.

The battery pack 26 is further formed with a through hole 45 extending over the width. The through hole 45 is utilizable in passing a wire or rope as a part of battery locking means therethrough in mounting the battery 2 on the battery holder 87. Further, a recess 46 is formed along the upper rear corner of the battery pack 26 as viewed in FIG. 4. The recess 46 functions as a catch for use in fixing the battery 2 to the bicycle frame after mounting the battery 2 on the battery holder 87.

Figure 6:
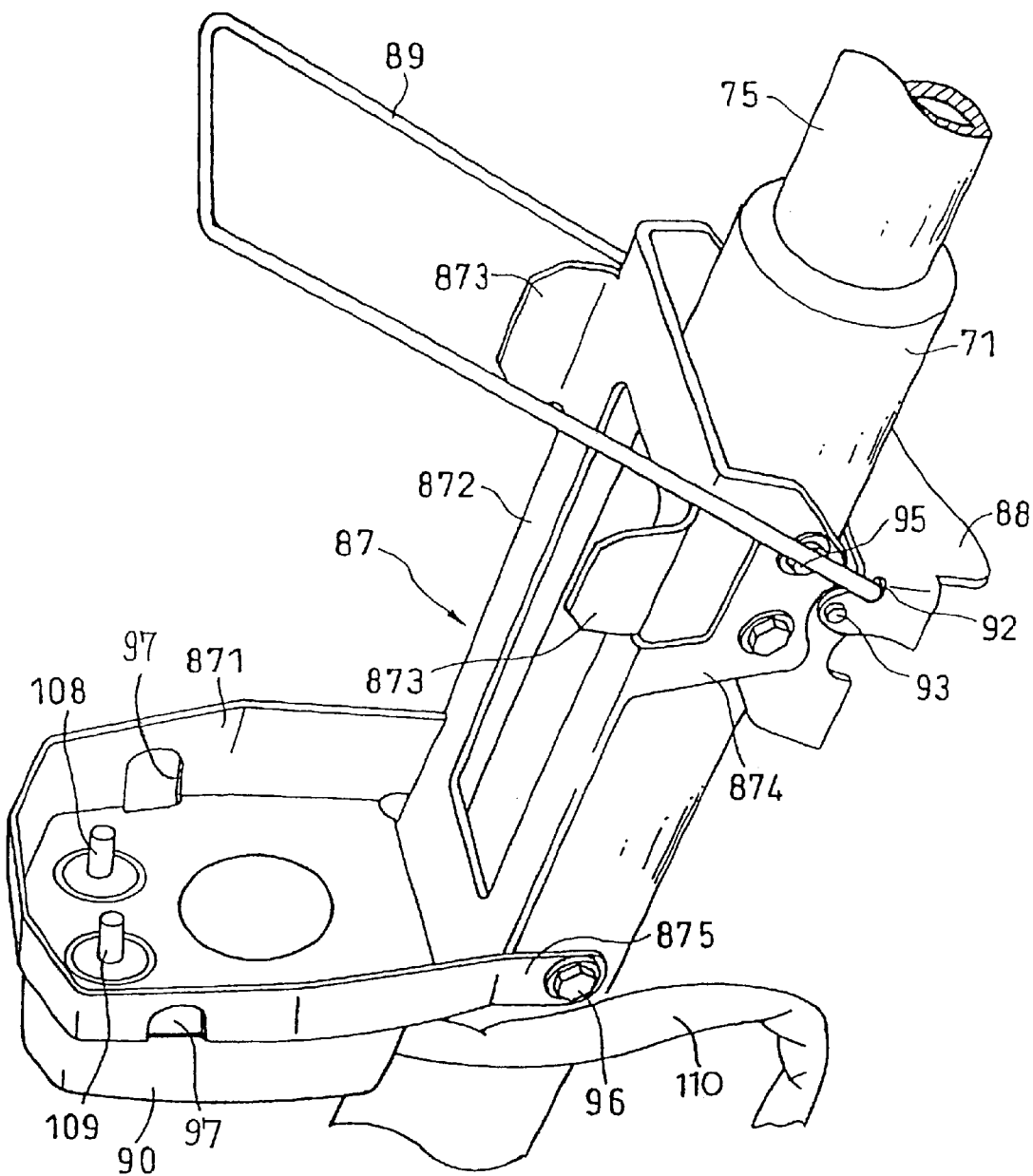
FIG. 6 is a perspective view of a battery holder.
Figure 7:
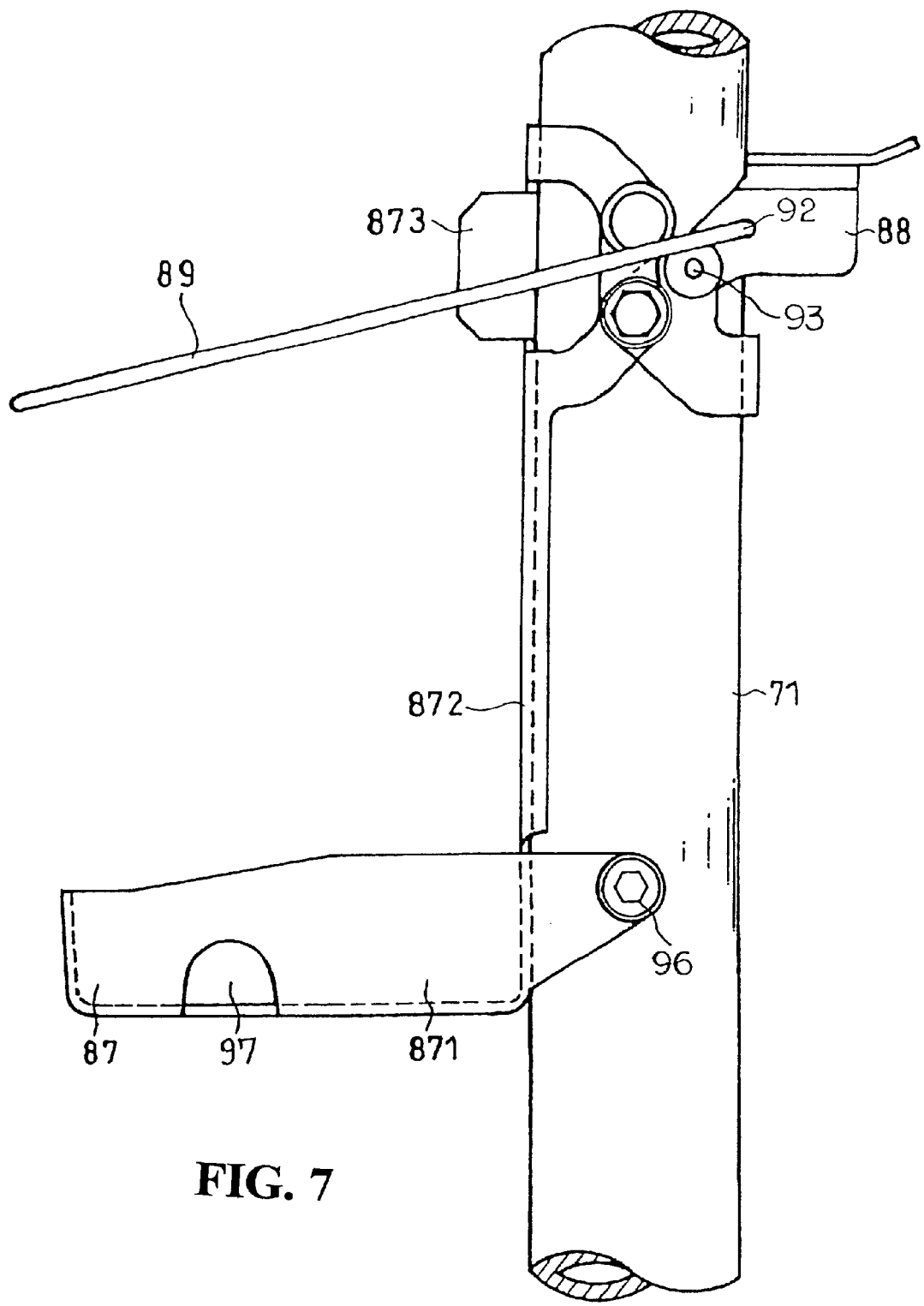
FIG. 7 is a side view of the battery holder.
Figure 8:
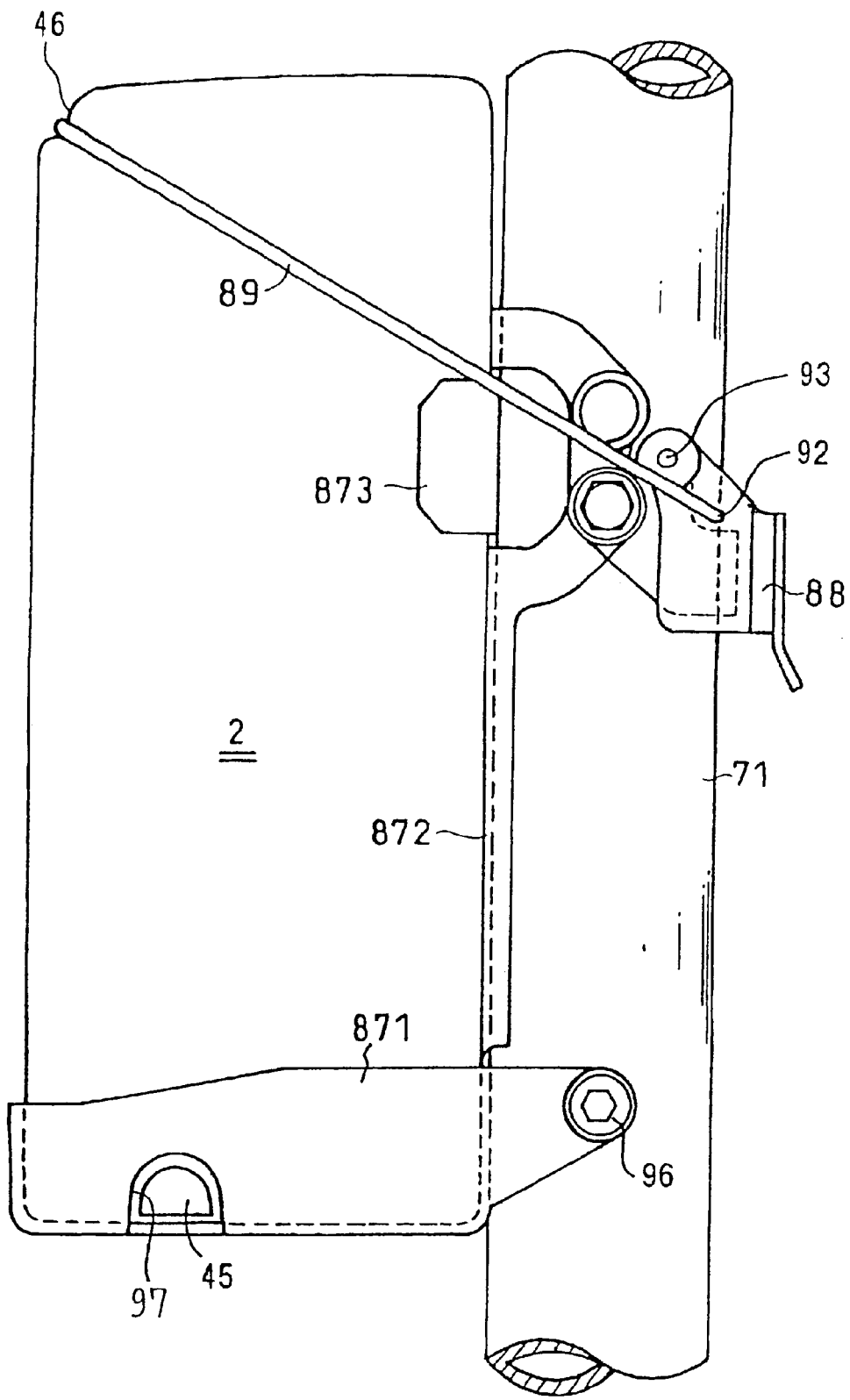
FIG. 8 is a side view of the battery holder in the condition where the battery is mounted thereon.

FIG. 6 is a perspective view of the battery holder 87, FIG. 7 is a side view of the battery holder 87 in the condition where the battery 2 is not mounted thereon, and FIG. 8 is a side view of the battery holder 87 where the battery 2 is mounted thereon.

The battery holder 87 includes a bottom plate portion 871 for receiving the battery 2, a back plate portion 872 extending upward from a rear side surface of the bottom plate portion 871, a pair of right and left side plate portions 873 formed by cutting and bending opposite side portions of the back plate portion 872 near its upper end for positioning the battery 2 in its lateral direction, a pair of right and left first flange portions 874 bent in a direction opposite to that of the side plate portions 873 so as to hold the seat post 71 in its radial direction, and a pair of right and left second flange portions 875 extending from opposite side surfaces of the bottom plate portion 871 beyond the back plate portion 872 so as to hold the seat post 71 in its radial direction at a position below the first flange portions 874. The battery holder 87 is fixed to the seat post 71 by securing the first and second flanges 874 and 875 to the bosses 71A and 71B (see FIG. 3) formed on the seat post 71 by means of bolts 95 and 96, respectively.

A buckle 88 is provided on the opposite side of the bottom plate portion 871 (on the rear side as viewed in FIG. 6) with respect to the seat post 71 so as to be pivotably supported to the first flange portions 874 by a lateral pivot shaft 93. A substantially U-shaped stop ring 89 is supported at its opposite ends to the buckle 88 at a position 92 offset from the pivot shaft 93. A pair of circular cylindrical electrodes 108 and 109 adapted to come into electrical contact with the terminals 28 and 29 of the battery 2, respectively, are exposed to the upper surface of the bottom plate portion 871.

In mounting the battery 2 into the battery holder 87, the end surface of the battery 2 where the terminals 28 and 29 are formed is placed on the bottom plate portion 87I, so that the battery 2 is positioned with respect to the battery holder 87, and the terminals 28 and 29 of the battery 2 are brought into electrical contact with the electrodes 108 and 109 on the bottom plate portion 87I. A feeder unit 90 connected to the electrodes 108 and 109 is provided under the bottom plate portion 87I to supply the power through a feeder line 110 to the power unit 86.

Figure 9:
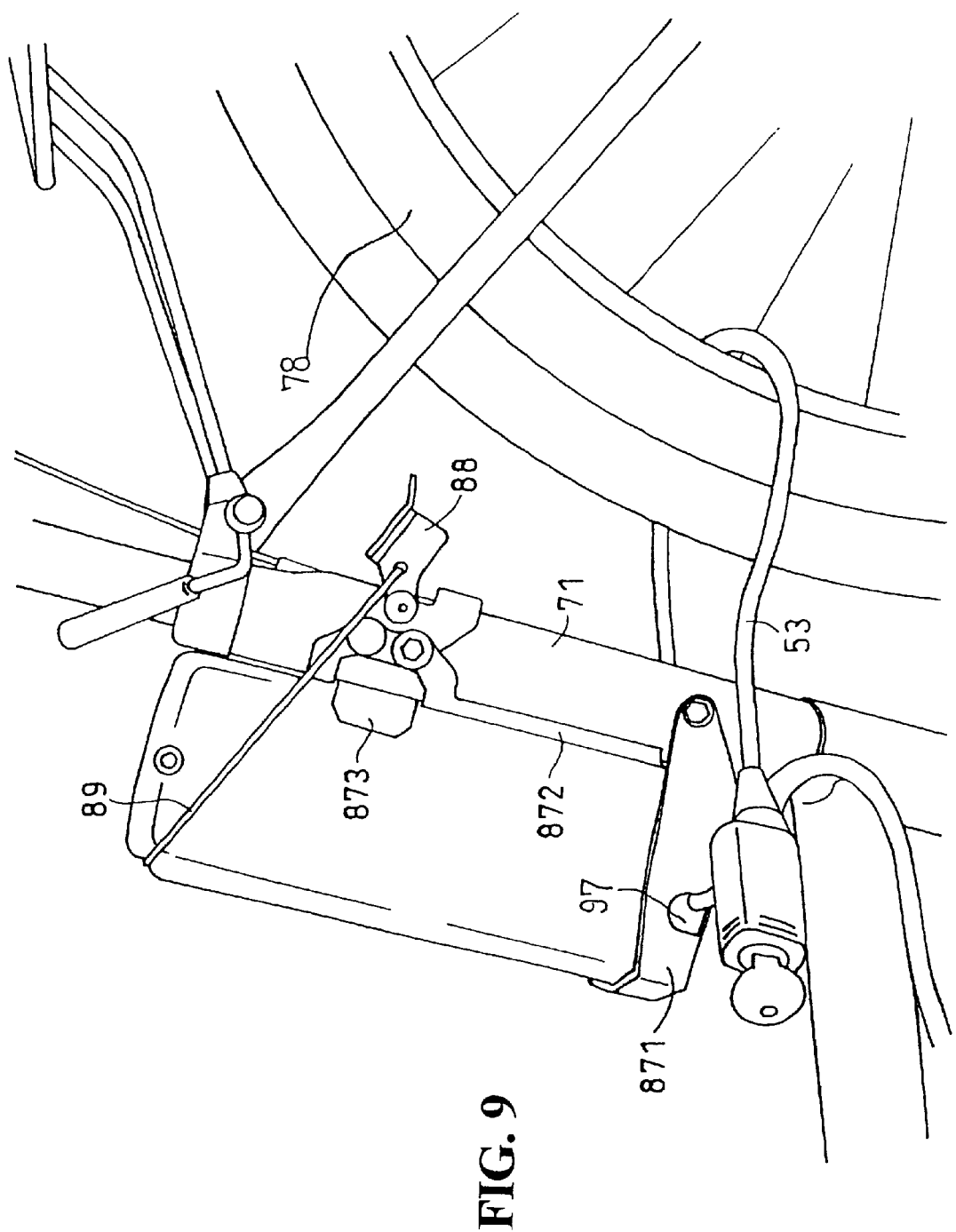
FIG. 9 is a side view of the battery holder in the condition where the battery mounted is locked.

As shown in FIG. 8, the battery 2 is securely fixed to the seat post 71 by first engaging the stop ring 89 with the recessed catch 46 formed at an upper end portion of the battery 2 as viewed in FIG. 8 and next rotating the buckle 88 about the pivot shaft 93 from an upper position shown in FIG. 7 to a lower position shown in FIG. 8. Further, a pair of aligned holes 97 are formed through the opposite side walls of the bottom plate portion 87I so that when the battery 2 is mounted on the battery holder 87 as shown in FIG. 8, the through hole 45 of the battery pack 26 is aligned with the holes 97. As shown in FIG. 9, a locking wire 53 is allowed to pass through the holes 97 of the battery holder 87 and the through hole 45 of the battery pack 26 and also to pass through the rear wheel 78, thereby preventing the theft of not only the motor-assisted bicycle itself, but also the battery 2.

Figure 10:
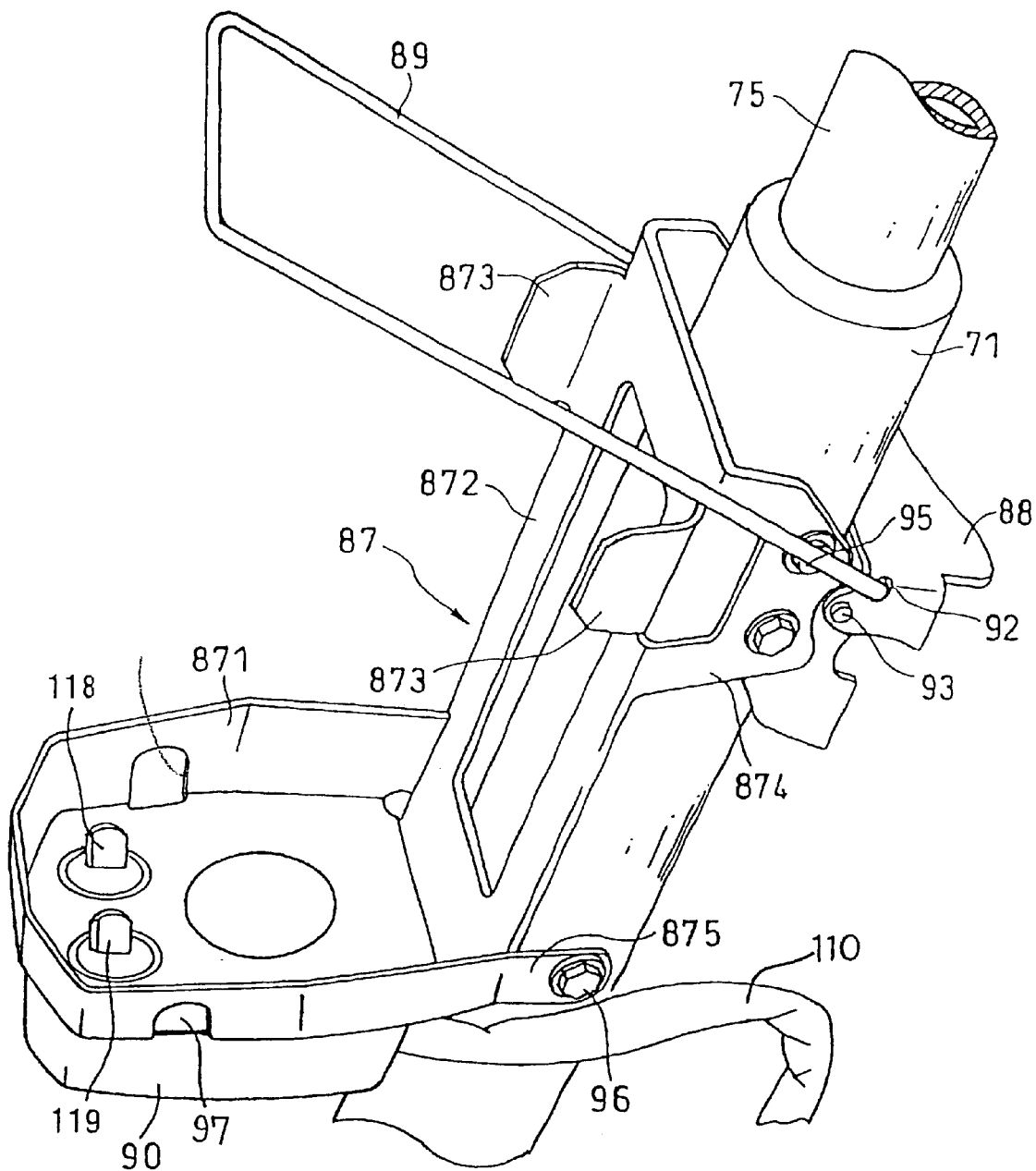
FIG. 10 is a perspective view of another preferred embodiment of the battery older.

The shape of the electrodes 108 and 109 exposed to the upper surface of the bottom plate portion 87I is merely illustrative, and any shape may be adopted. For example, electrodes 118 and 119 shown in FIG. 10 are general-purpose flat electrodes having specifications similar to those of an AC plug adapted to be fitted into an AC 100 V home outlet.

Figure 11:
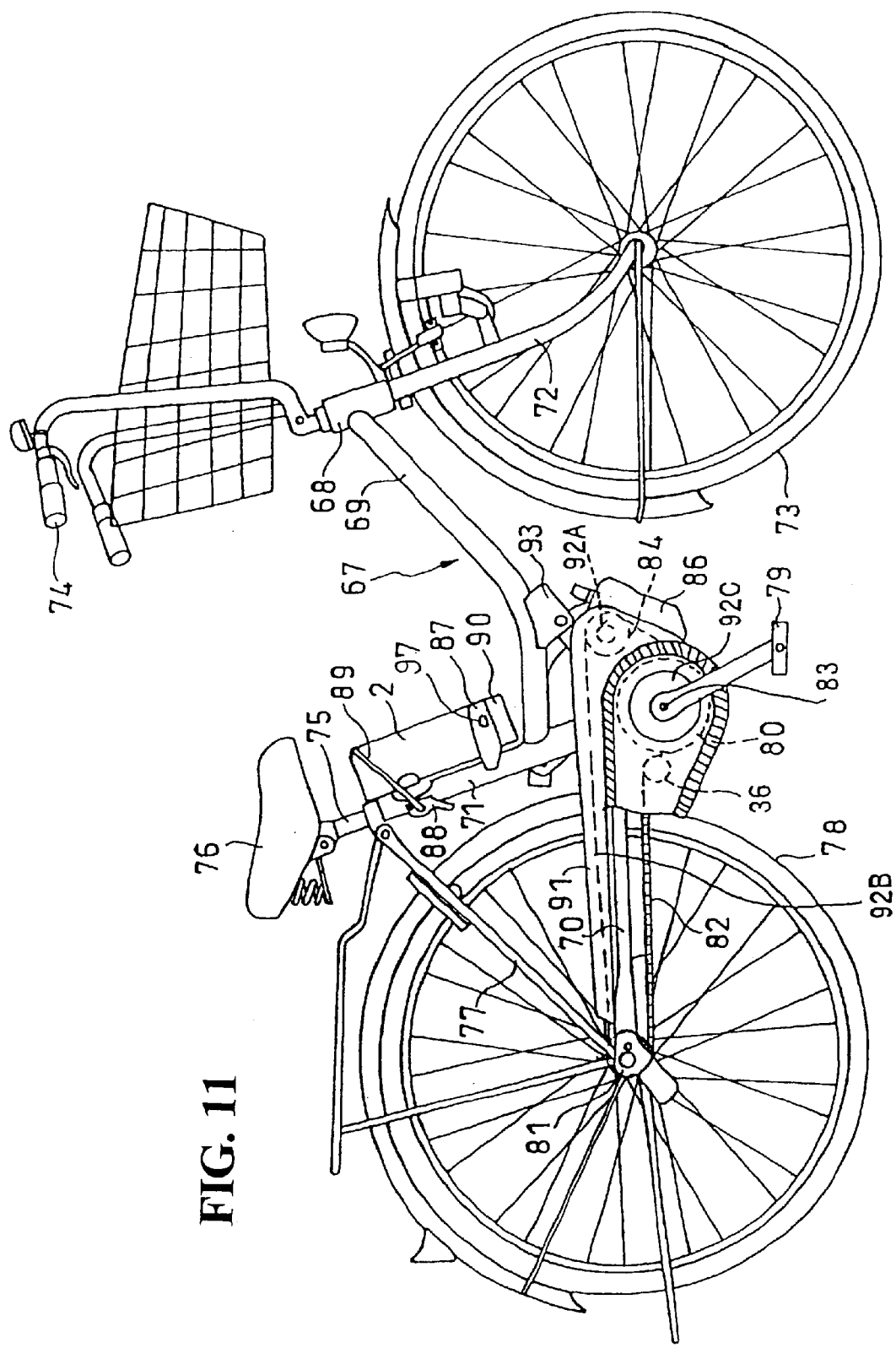
FIG. 11 is a side view of a motor-assisted bicycle (F/F structure) according to second preferred embodiment of the present invention.

FIG. 11 is a side view of a motor-assisted bicycle according to a second preferred embodiment of the present invention. In FIG. 11, the same reference numerals as those shown in FIG. 1 denote the same or like parts.

Like the first preferred embodiment shown in FIG. 1, the motor-assisted bicycle shown in FIG. 11 also has an F/F structure such that the battery 2 is mounted on the front side (F) of the seat post 71 and the assist power generated by the power unit 86 is input into the chain line at a position on the front side (F) of the crankshaft 83. The second preferred embodiment is slightly different from the first preferred embodiment in the structure of the bicycle frame 67 and the shape of the chain cover 91.

Figure 12:
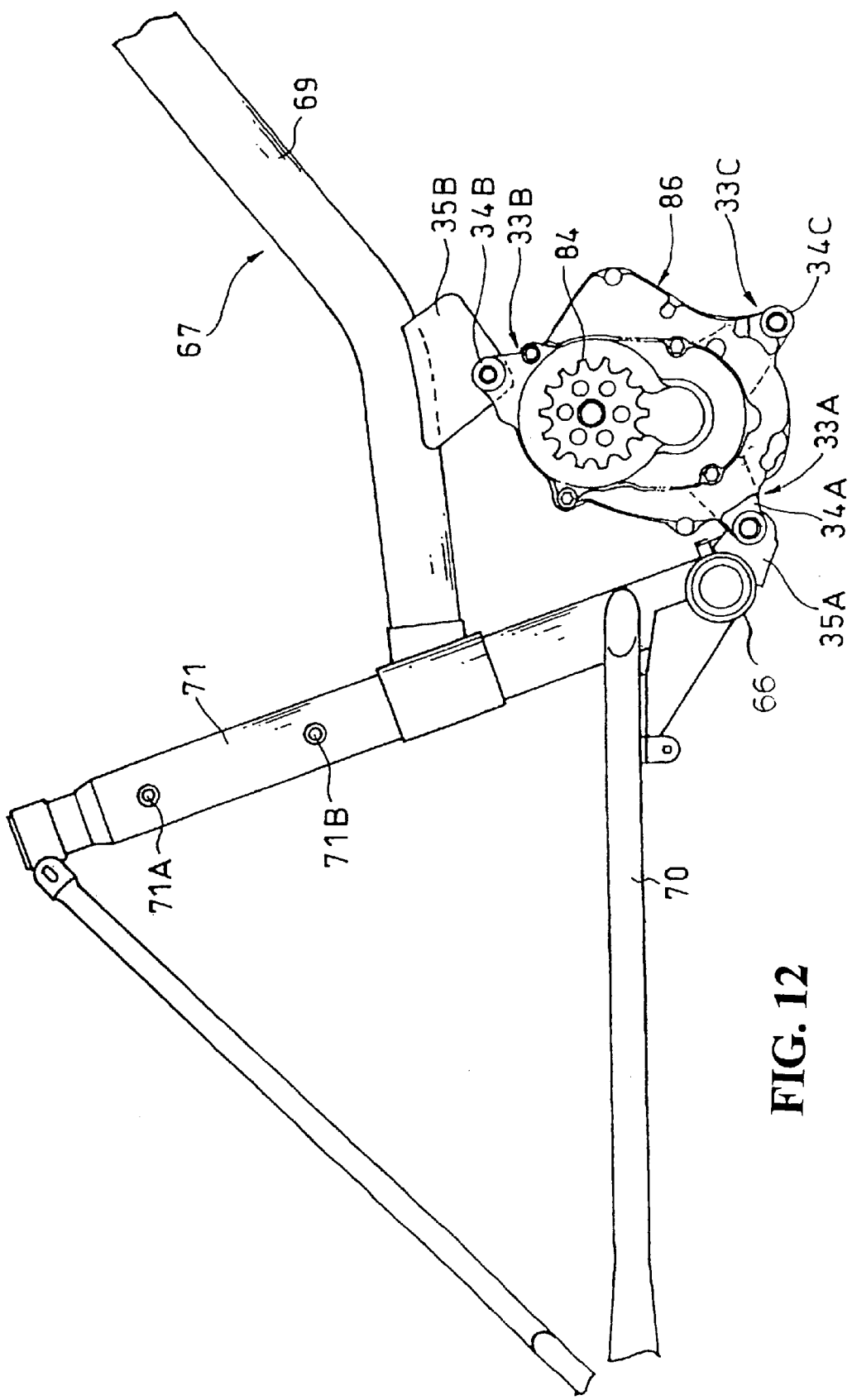
FIG. 12 is an enlarged side view showing a mounting structure of a power unit to a bicycle frame in the motor-assisted bicycle shown in FIG. 11.
Figure 13:
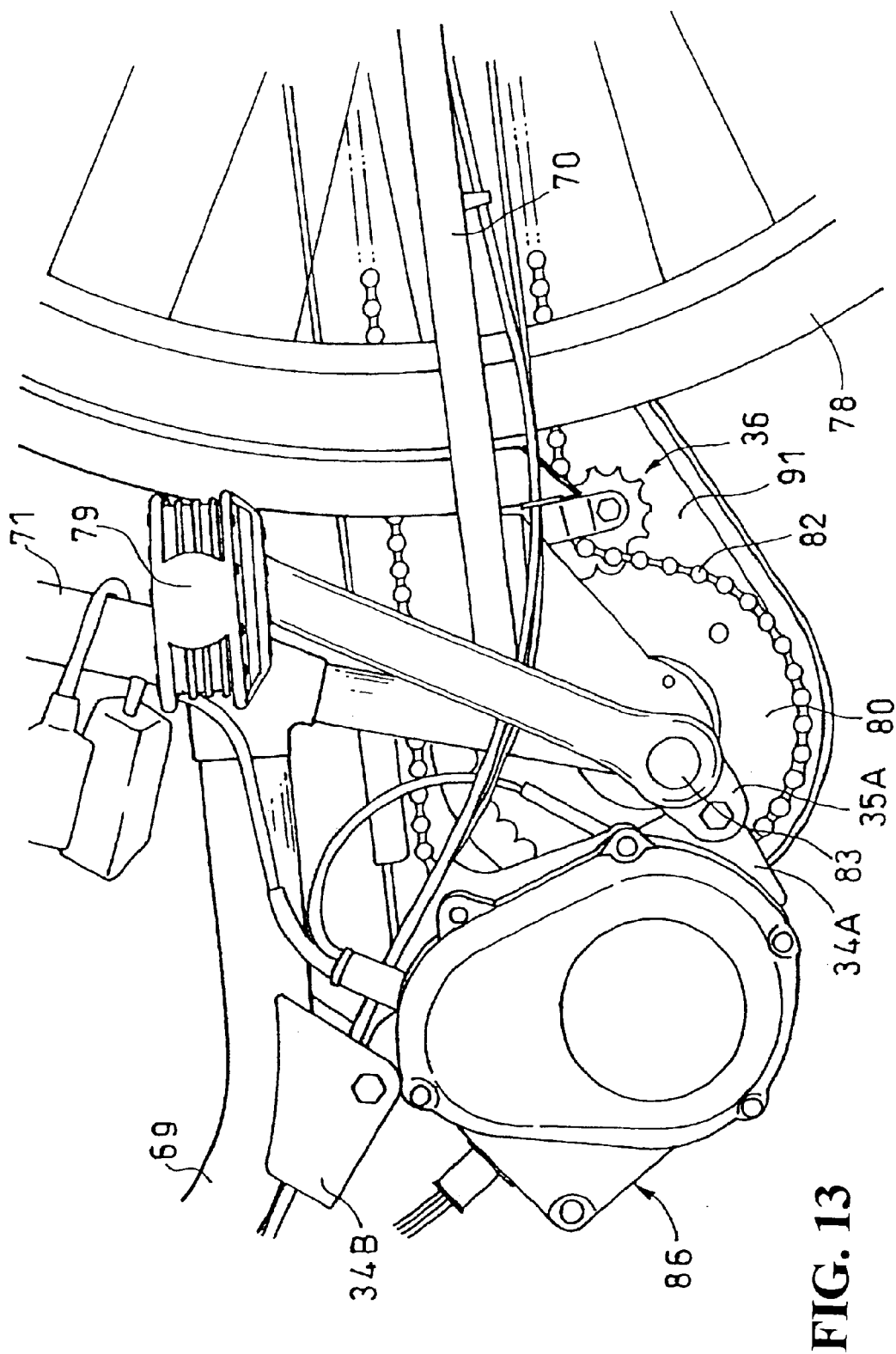
FIG. 13 is an enlarged side view showing a structure in the periphery of a pedal sprocket in the motor-assisted bicycle shown in FIG. 11 as seen from the back side of FIG. 11.

FIG. 12 is an enlarged side view showing a fixing method for the power unit 86 to the bicycle frame 67 in the second preferred embodiment, and FIG. 13 is a similar enlarged side view as seen from the back side of FIG. 11.

Also in this preferred embodiment, the bicycle frame 67 is an existing bicycle frame designed and manufactured for a usual bicycle. That is, as shown in FIG. 12, the flanges 35A and 35B are after-fixed to the support pipe 66 and the down pipe 69 of the bicycle frame 67, respectively. The power unit 86 is fixed in position and attitude to the bicycle frame 67 by bolting the two bosses 34A and 34B formed at the selected ones 33A and 33B of the three boss forming spaces 33A, 33B, and 33C to the flanges 35A and 35B, respectively, in such a manner that the drive sprocket 84 comes into mesh with the chain 82 at a position on the front side of the crankshaft 83.

While the idle boss 34C is formed at the boss forming space 33C in this preferred embodiment, the formation of the idle boss 34C may be omitted in advance as similarly to the first preferred embodiment.

Thus, the flanges 35A and 35B for fixing the power unit 86 can be after-fixed to any existing bicycle frame, so that the power unit 86 can be used as a common assist power source irrespective of the shapes of various bicycle frames. Accordingly, the power unit 86 can be commonly used for various bicycle frames only by the addition of slight modifications.

Also in this preferred embodiment, the chain cover 91 has an integral structure composed of a drive sprocket cover portion 92A for covering the drive sprocket 84, a chain cover portion 92B for covering the stretched portion of the chain 82, and a pedal sprocket cover portion 92C for covering the upper half of the pedal sprocket 80 as shown in FIG. 11. Unlike the first preferred embodiment, however, a dark color is applied to an area of the pedal sprocket cover portion 92C corresponding to the outline of the pedal sprocket 80, and no particular accent is applied to the drive sprocket cover portion 92A to ensure no awareness of the presence of the drive sprocket 84.

Figure 14:
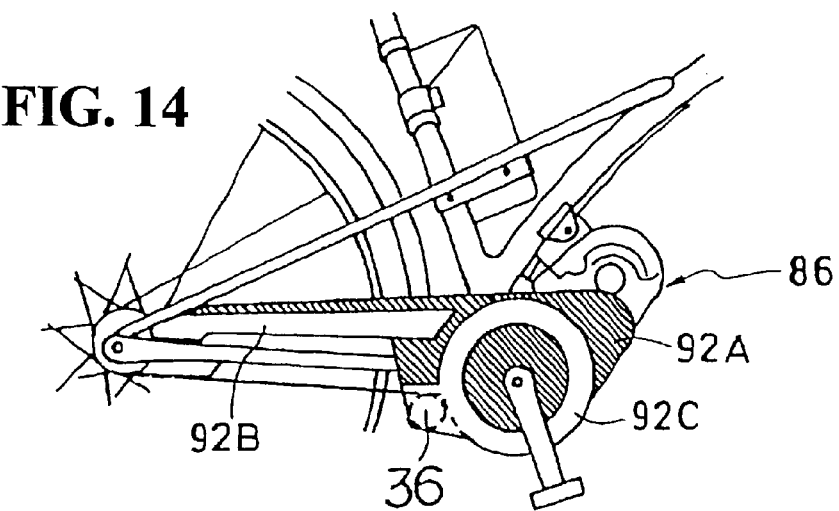
FIG. 14 is a side view showing a modification (F/F structure) of the motor-assisted bicycle according to the second preferred embodiment.
Figure 15:
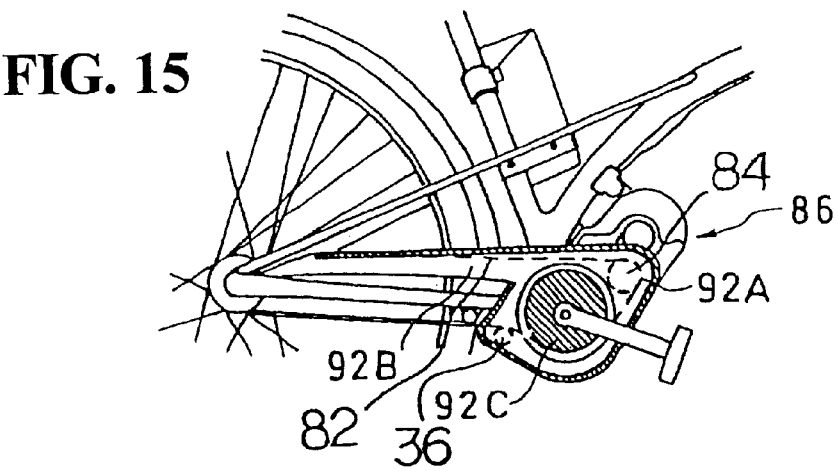
FIG. 15 is a side view showing another modification (F/F structure) of the motor-assisted bicycle according to the second preferred embodiment.
Figure 16:
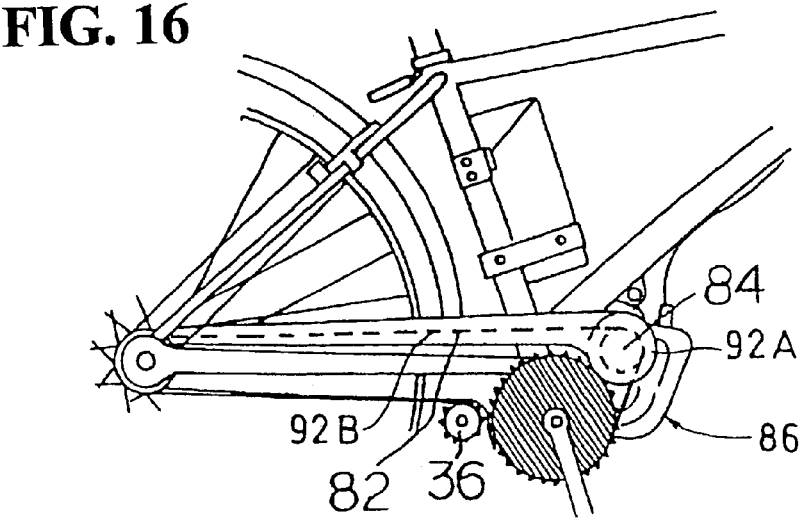
FIG. 16 is a side view showing still another modification (F/F structure) of the motor-assisted bicycle according to the second preferred embodiment.

FIGS. 14, 15, and 16 are side views showing various modifications of a similar F/F type motor-assisted bicycle, in which the same reference numerals denote the same or like parts. These modifications are similar to the first and second preferred embodiments in the mounting method for the power unit 86 to the bicycle frame 67, and have differences in the chain cover 91.

In the motor-assisted bicycle shown in FIG. 14, the drive sprocket 84, the stretched portion of the chain 82, and the pedal sprocket 80 are fully covered with the single chain cover 91. The chain cover portion 92B and the pedal sprocket cover portion 92C are coated with the same bright color, and the drive sprocket cover portion 92A has such a shape as to be continuous to the other portion coated with a dark color, so as to ensure no awareness of the presence of the drive sprocket 84.

In the motor-assisted bicycle shown in FIG. 15, the drive sprocket 84, the stretched portion of the chain 82, and the pedal sprocket 80 are fully covered with the single chain cover 91. The drive sprocket cover portion 92A has such a shape as to be continuous to the chain cover portion 92B coated with the same color, so as to ensure no awareness of the presence of the drive sprocket 84.

In the motor-assisted bicycle shown in FIG. 16, the drive sprocket 84 and the stretched portion of the chain 82 are fully covered with the single chain cover 91. The drive sprocket cover portion 92A and the chain cover portion 92B have the same color, so as to ensure no awareness of the presence of the drive sprocket 84.

According to each chain cover 91 mentioned above, the drive sprocket cover portion 92A becomes inconspicuous. Accordingly, the poor appearance due to the addition of the drive sprocket cover portion 92A can be improved, and it is possible to achieve any desirable design of the chain cover 91 independently of the presence of the drive sprocket cover portion 92A.

Figure 17:
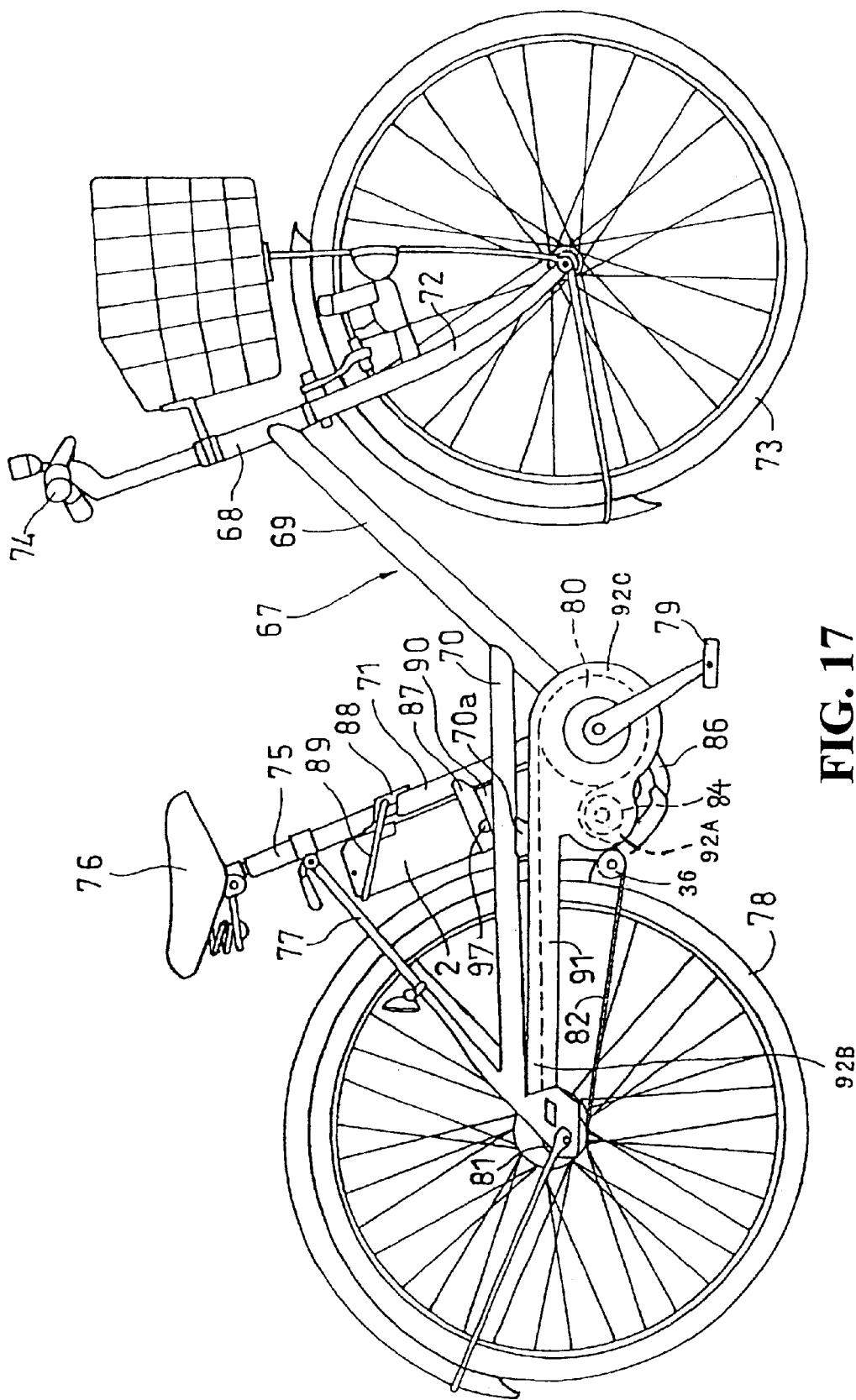
FIG. 17 is a side view of a motor-assisted bicycle (R/R structure) according to a third preferred embodiment of the present invention.

FIG. 17 is a side view of a motor-assisted bicycle according to a third preferred embodiment of the present invention, in which the same reference numerals as those shown in FIG. 1 denote the same or like parts.

Also in this preferred embodiment, the bicycle frame 67 is an existing bicycle frame designed and manufactured for a usual bicycle. Unlike the first and second preferred embodiments, the third preferred embodiment adopts an R/R structure such that the battery 2 is mounted on the rear side (R) of the seat post 71 and the assist power generated by the power unit 86 is input into the chain line at a position on the rear side (R) of the crankshaft 83.

Figure 18:
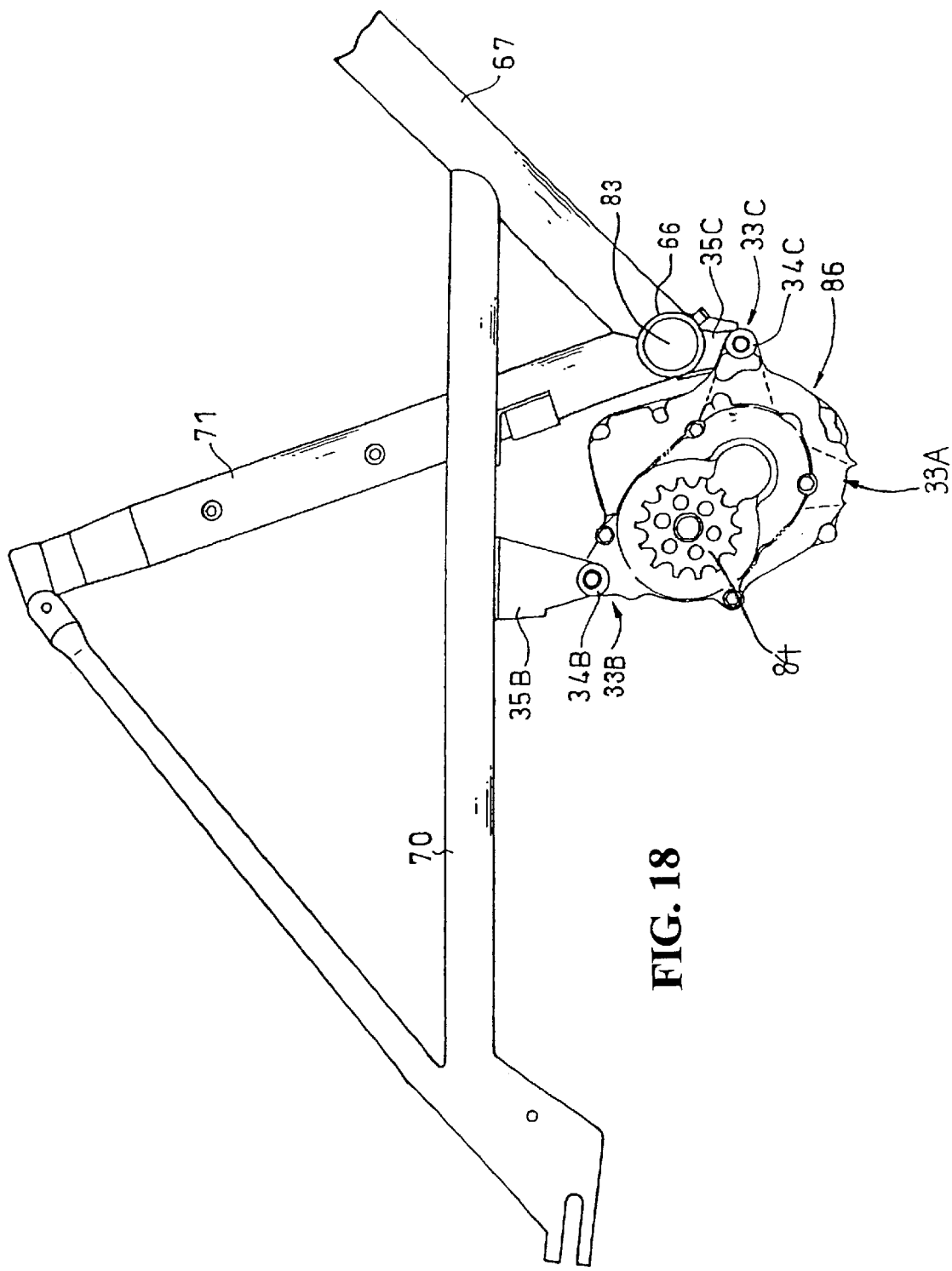
FIG. 18 is an enlarged side view showing a mounting structure of a power unit to a bicycle frame in the motor-assisted bicycle shown in FIG. 17.
Figure 19:
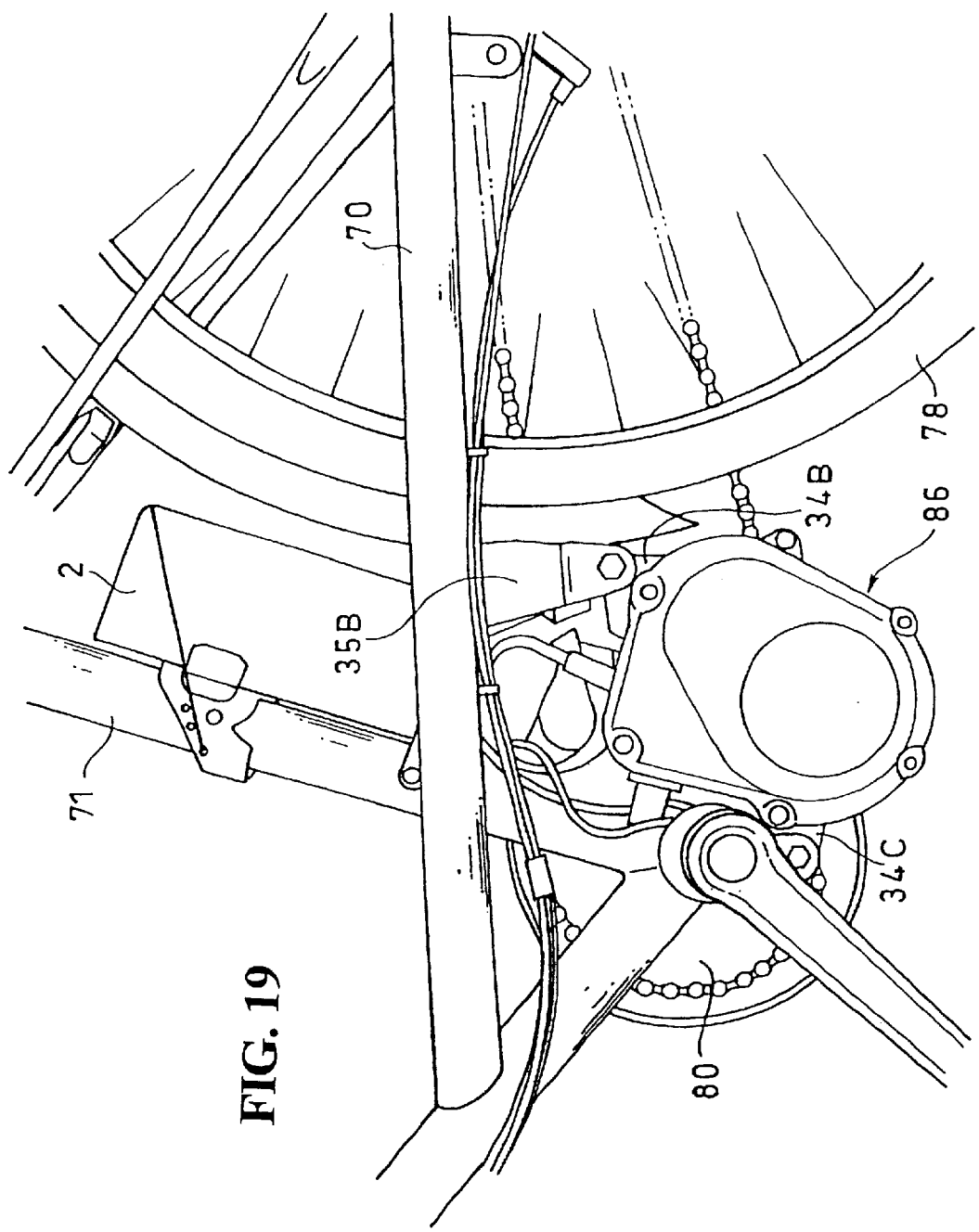
FIG. 19 is an enlarged side view showing a structure in the periphery of a pedal sprocket in the motor-assisted bicycle shown in FIG. 17.

FIG. 18 is an enlarged side view showing a fixing method for the power unit 86 to the bicycle frame 67 in the third preferred embodiment, and FIG. 19 is a similar enlarged side view as seen from the back side of FIG. 17.

As shown in FIG. 18, flanges 35C and 35B are after-fixed to the support pipe 66 and the rear fork 70 of the bicycle frame 67, respectively. The power unit 86 has three boss forming spaces 33A, 33B, and 33C, and two bosses 34C and 34B are formed at the boss forming spaces 33C and 33B, respectively. The two bosses 34C and 34B are bolted to the two flanges 35C and 35B, respectively, thus positioning the power unit 86 so that the drive sprocket 84 comes into mesh with the chain 82 at a position on the rear side of the crankshaft 83. In this preferred embodiment, the boss 34A to be formed at the boss forming space 33A is omitted in advance.

As shown in FIG. 17, the chain cover 91 has an integral structure composed of a drive sprocket cover portion 92A, a chain cover portion 92B, and a pedal sprocket cover portion 92C. The drive sprocket cover portion 92A has the same color as that of the chain cover portion 92B and the pedal sprocket cover portion 92C, thereby making the drive sprocket cover portion 92A appear continuous to the other portions 92B and 92C.

Figure 20:
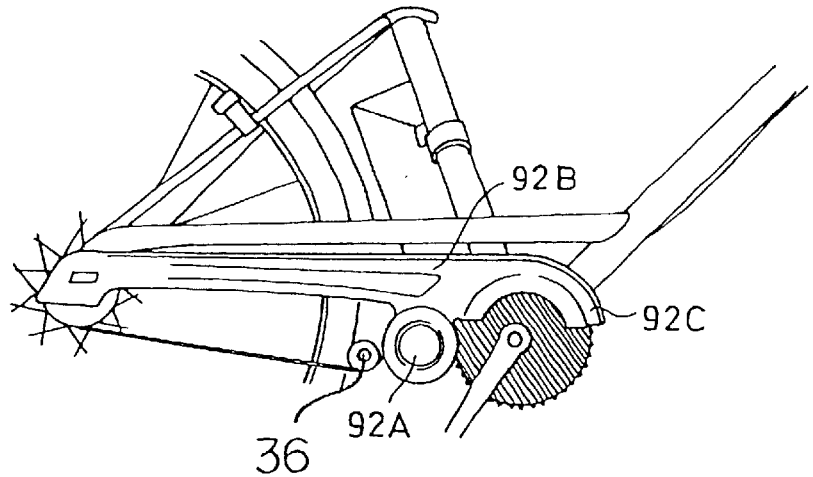
FIG. 20 is a side view showing a modification (R/R structure) of the motor-assisted bicycle according to the third preferred embodiment.
Figure 21:
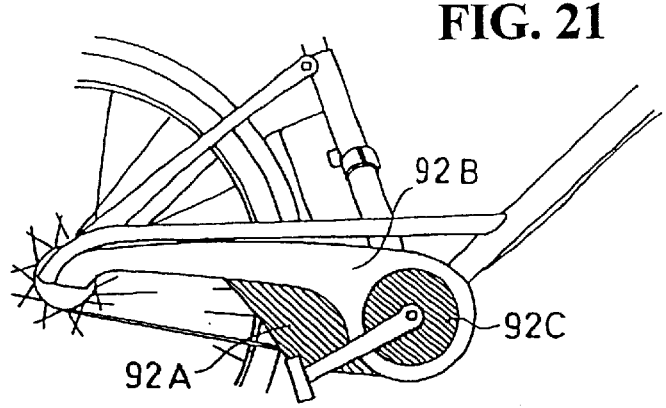
FIG. 21 is a side view showing another modification (R/R structure) of the motor-assisted bicycle according to the third preferred embodiment.
Figure 22:
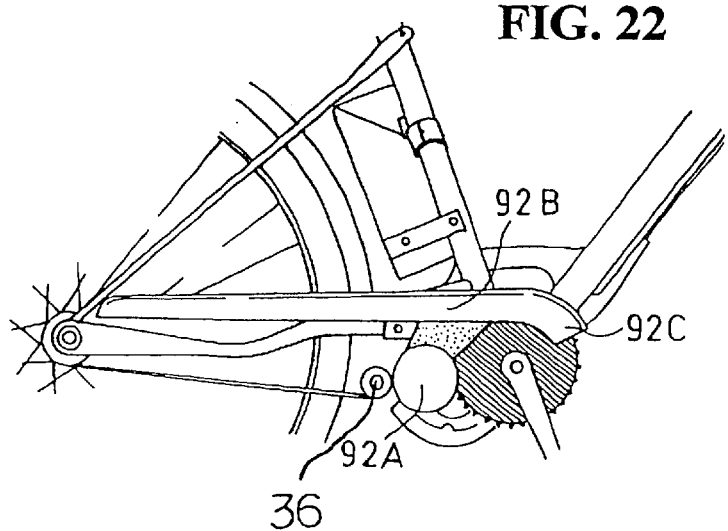
FIG. 22 is a side view showing still another modification (R/R structure) of the motor-assisted bicycle according to the third preferred embodiment.

FIGS. 20, 21, and 22 are side views showing various modifications of the third preferred embodiment. In FIGS. 20 to 22, the same reference numerals as those shown in FIG. 17 denote the same or like parts. These modifications are similar to the third preferred embodiment in the mounting method for the power unit 86 to the bicycle frame 67, and have differences in the chain cover 91.

In the motor-assisted bicycle shown in FIG. 20, the drive sprocket 84, the stretched portion of the chain 82, and an upper portion of the pedal sprocket 80 are covered with the single chain cover 91. The drive sprocket cover portion 92A has a circular shape corresponding to the outside shape of the drive sprocket 84, and this circular portion is positively utilized as a kind of ornament.

In the motor-assisted bicycle shown in FIG. 21, the drive sprocket 84, the stretched portion of the chain 82, and the pedal sprocket 80 are fully covered with the single chain cover 91. The drive sprocket cover portion 92A and the pedal sprocket cover portion 92C are coated with the same dark color, so as to ensure no awareness of the presence of the drive sprocket 84.

In the motor-assisted bicycle shown in FIG. 22, the drive sprocket 84, the stretched portion of the chain 82, and an upper portion of the pedal sprocket 80 are covered with the single chain cover 91. The drive sprocket cover portion 92A has an independent shape in design, and this circular portion is positively shaped as a kind of ornament.

Figure 23:
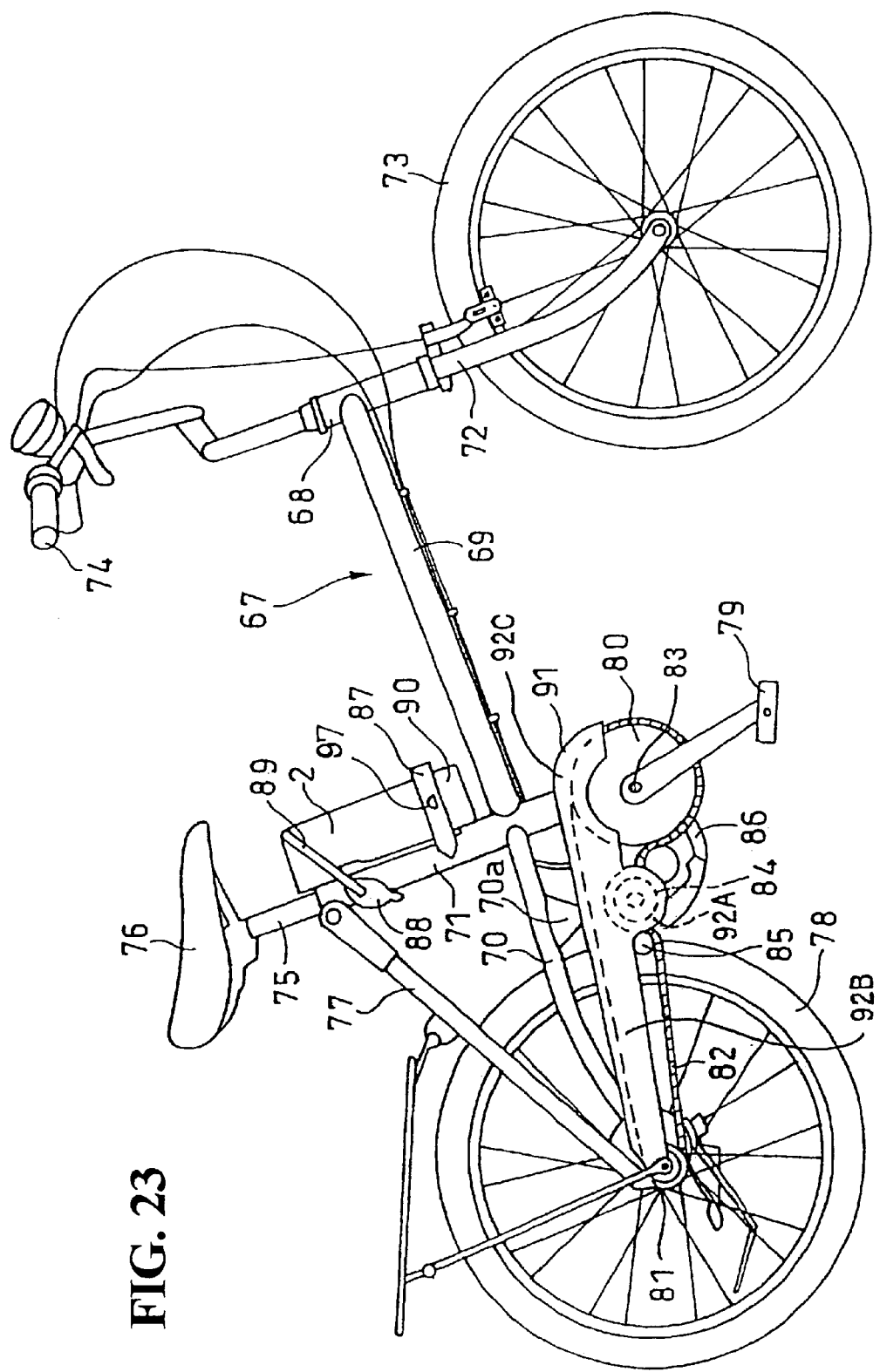
FIG. 23 is a side view of a motor-assisted bicycle (F/R structure) according to a fourth preferred embodiment of the present invention

FIG. 23 is a side view of a motor-assisted bicycle according to a fourth preferred embodiment of the present invention, in which the same reference numerals as those shown in FIG. 1 denote the same or like parts.

Also in this preferred embodiment, the bicycle frame 67 is an existing bicycle frame designed and manufactured for a usual bicycle. Unlike the first preferred embodiment, the fourth preferred embodiment employs an F/R structure such that the battery 2 is mounted on the front side (F) of the seat post 71 and the assist power generated by the power unit 86 is input into the chain line at a position on the rear side (R) of the crankshaft 83.

Also in this case where the drive sprocket 84 is located on the rear side of the crankshaft 83, the chain cover 91 is suitably designed in shape or color to thereby improve the poor appearance due to the addition of the drive sprocket cover portion 92A, thus allowing any desirable design of the chain cover 91 independently of the presence of the drive sprocket cover portion 92A.

Figure 24:
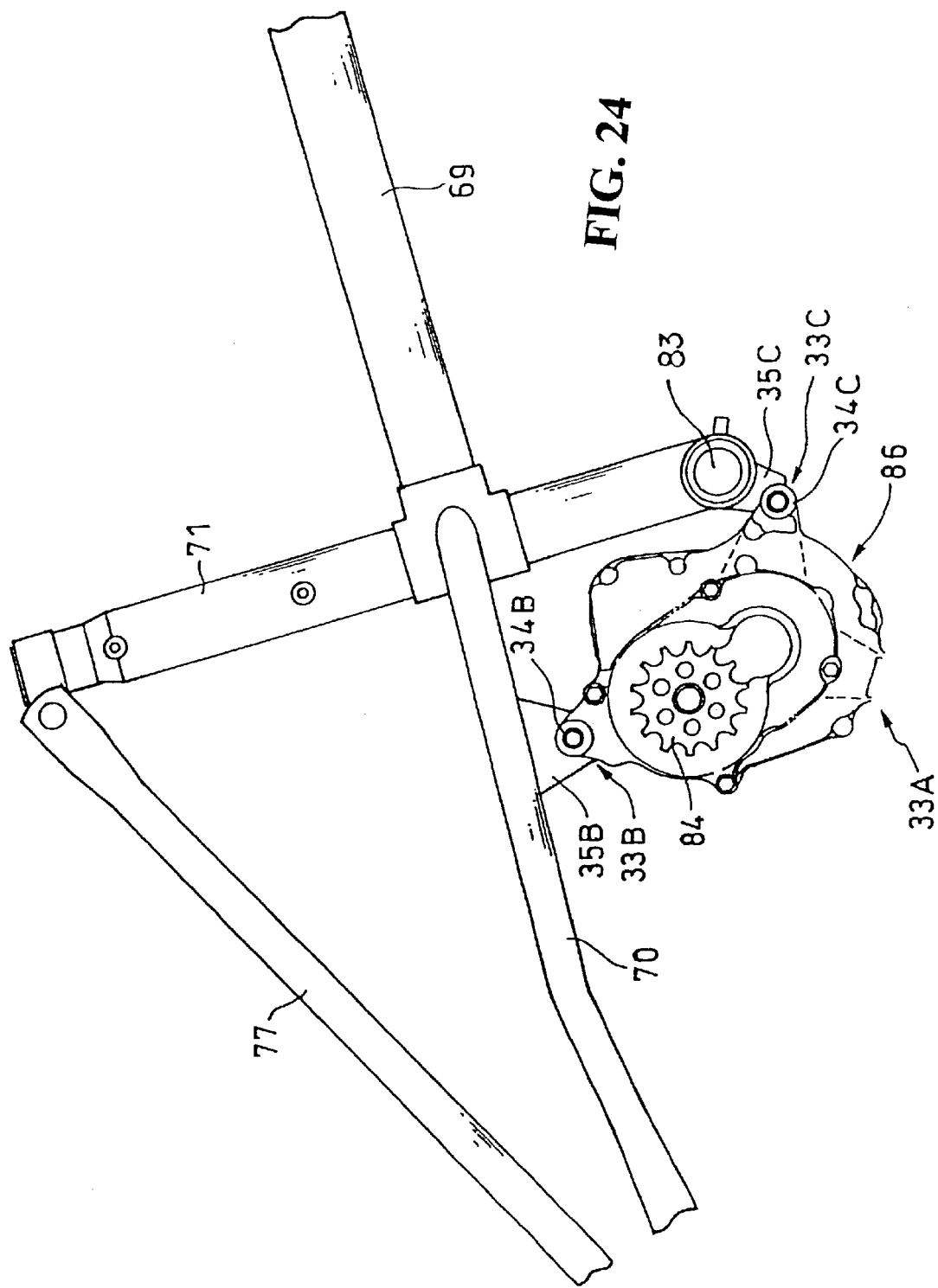
FIG. 24 is an enlarged side view showing a mounting structure of a power unit to a bicycle frame in the motor-assisted bicycle shown in FIG. 23.
Figure 25:
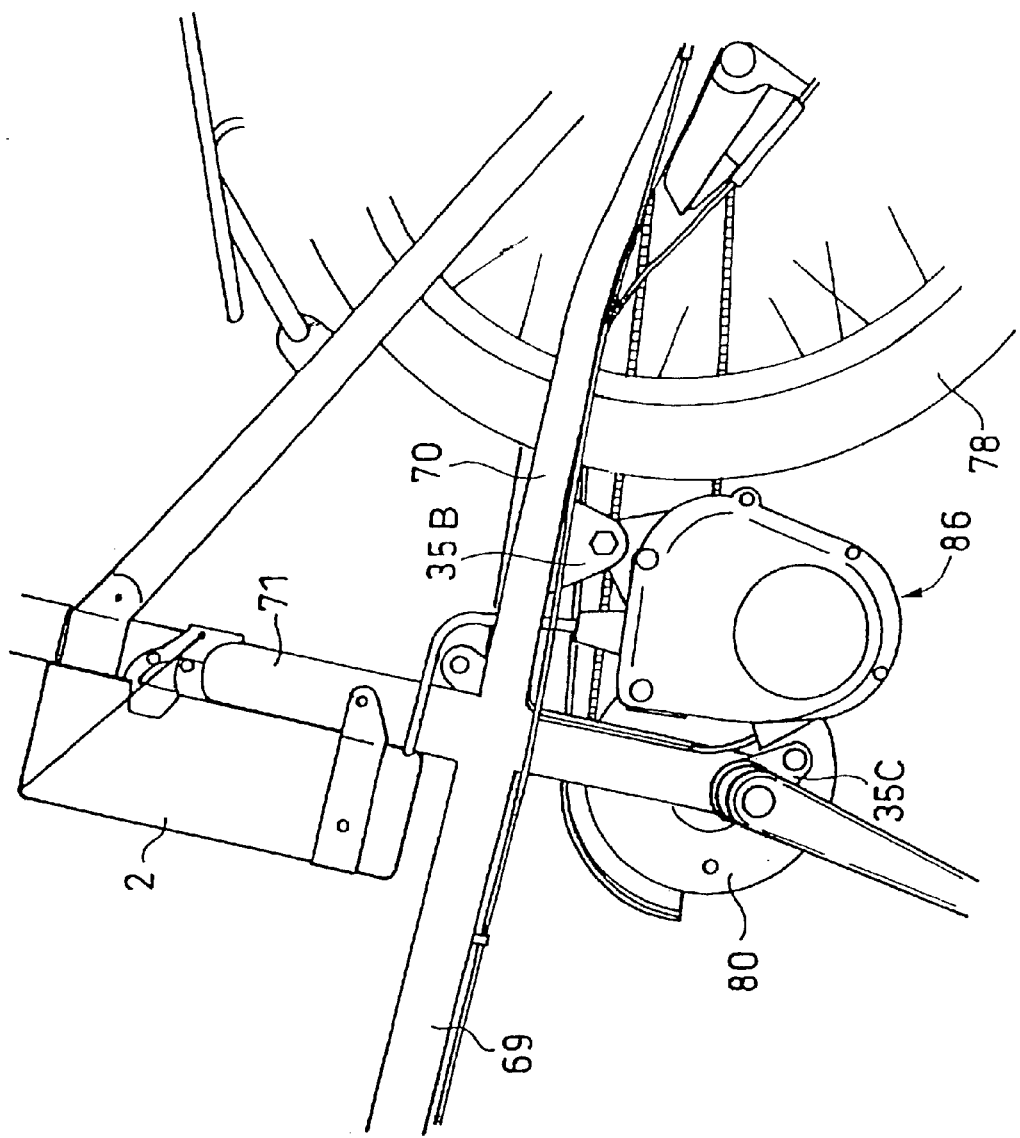
FIG. 25 is an enlarged side view showing a structure in the periphery of a pedal sprocket in the motor-assisted bicycle shown in FIG. 23.

FIG. 24 is an enlarged side view showing a fixing method for the power unit 86 to the bicycle frame 67 in this preferred embodiment, and FIG. 25 is a similar enlarged side view as seen from the back side of FIG. 23.

Like the third preferred embodiment shown in FIG. 17, flanges 35C and 35B are after-fixed to the support pipe 66 and the rear fork 70 of the bicycle frame 67, respectively, and the power unit 86 is fixed in position and attitude to the bicycle frame 67 so that the drive sprocket 84 is in mesh with the chain 82 at a position on the rear side of the crankshaft 83, by bolting the two bosses 34C and 34B to the two flanges 35C and 35B, respectively. Also in this preferred embodiment, the boss 34A to be formed at the boss forming space 33A is omitted in advance.

The chain cover 91 in this preferred embodiment is similar to that shown in FIG. 20. That is, the drive sprocket 84, the stretched portion of the chain 82, and an upper portion of the pedal sprocket 80 are covered with the single chain cover 91, and the drive sprocket cover 92A has a circular shape corresponding to the outside shape of the drive sprocket 84 so that the circular portion is positively utilized as a kind of ornament.

In each preferred embodiment mentioned above, an existing bicycle frame designed and manufactured for a usual bicycle is used, and flanges are after-fixed to the bicycle frame at specific positions. Further, the power unit has a plurality of bosses to be selectively used and connected to the flanges. Accordingly, the power unit can be mounted on the bicycle frame at a specific position in a specific attitude, depending on the kind of the existing bicycle frame. Thus, the power unit can be used commonly for various existing bicycle frames.

Furthermore, in each preferred embodiment mentioned above, the drive sprocket 84, the stretched portion of the chain 82, and the pedal sprocket 80 are covered with the single chain cover 91. The drive sprocket cover portion 92A is made positively different in shape or color from the other cover portions 92B and 92C for the purpose of positive utilization as a kind of ornament, or is made continuous in shape and color to the other cover portions 92B and 92C to ensure no awareness of the presence of the drive sprocket 84. Thus, the design limit due to the presence of the drive sprocket cover portion 92A can be minimized. As a result, the poor appearance due to the unfamiliar shape of the chain cover can be improved.

While the battery 2 mounted on the motor-assisted bicycle is basically owned by an individual, there has recently been a growing interest in a battery exchanging system such that a returned battery is replaced by a recharged battery that can be rented and that such recharged batteries are stocked for rent.

Figure 26:
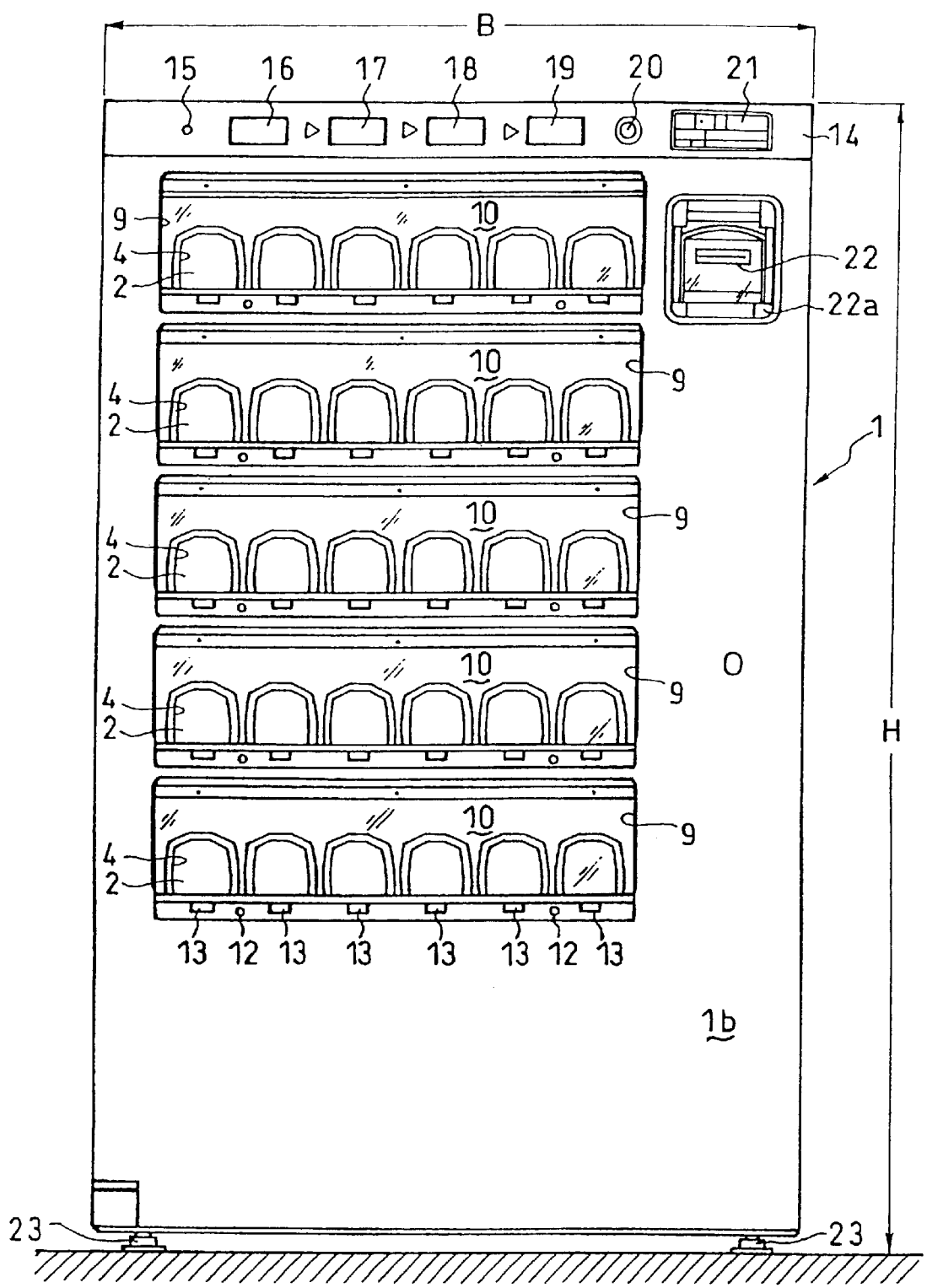
FIG. 26 is a front elevation of a battery exchanging machine.
Figure 27:
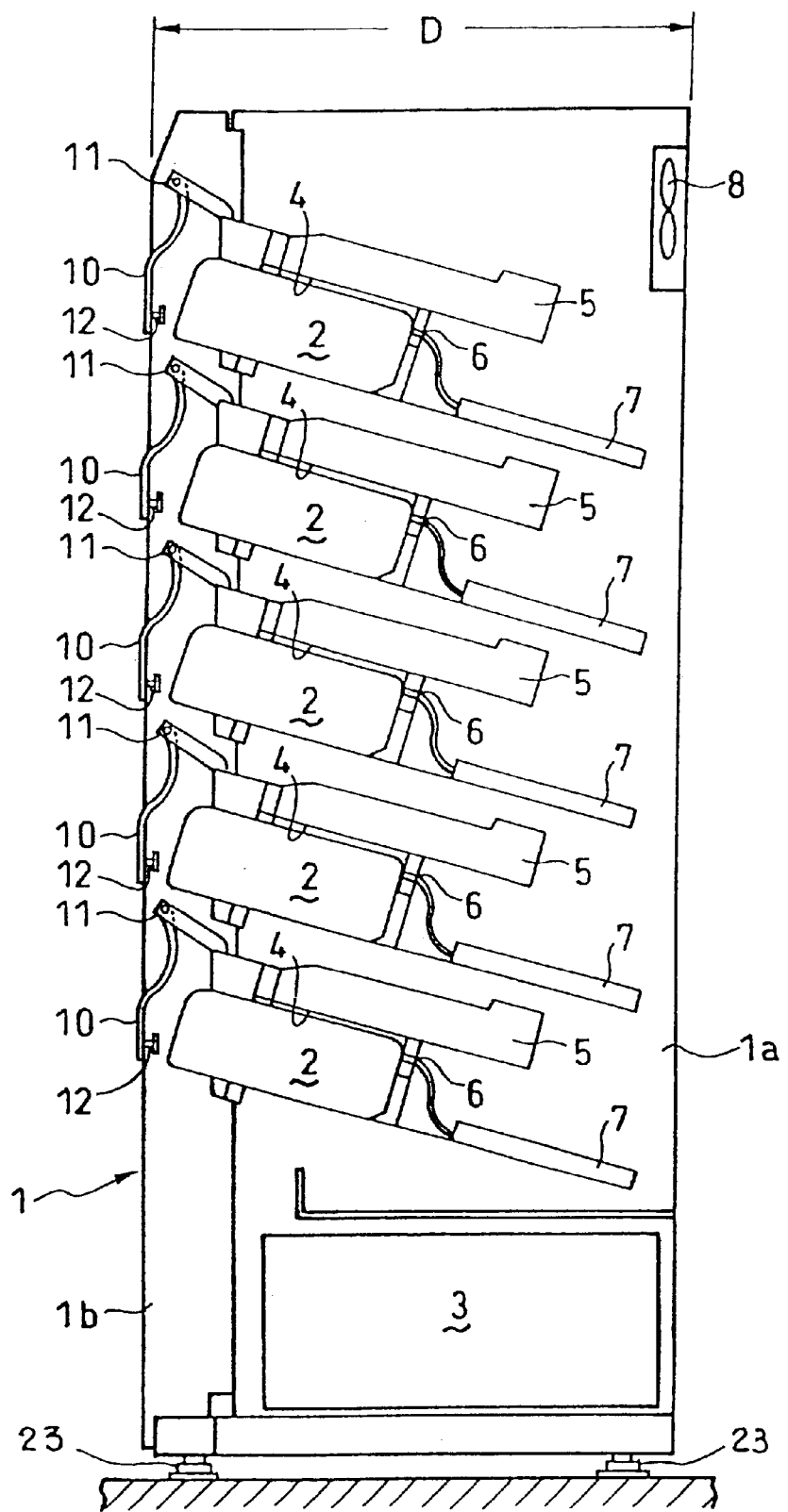
FIG. 27 is a sectional side view of the battery exchanging machine.

FIG. 26 is a front elevation of a battery exchanging machine 1 for recharging and exchanging the battery 2, and FIG. 27 is sectional side view of the battery exchanging machine 1. The battery exchanging machine 1 is constructed of a rectangular cylindrical box in external appearance. The box is composed generally of a body 1a having a front opening and a space for accommodating a plurality of batteries 2 and a controller (including a power supply unit and a control unit) 3 and a front cover 1b for openably closing the front opening of the body 1a.

The body 1a is provided with a plurality of slots 4 arranged in six rows and five columns for respectively accommodating the batteries 2. That is, the battery exchanging machine 1 shown in FIG. 26 can accommodate a total of thirty batteries 2 at a time. Each slot 4 has a holding mechanism 5 for the battery 2. The bottom or rear wall surface of each slot 4 is provided with terminals 6 for recharging of the battery 2. The terminals 6 are connected to a recharger 7.

Each slot 4 has sensor means for detecting that the battery 2 has been inserted. When the battery 2 is inserted into the slot 4, the recharger 7 is operated to recharge the battery 2. The starting of the detection and recharging of the battery 2 can be instructed by the controller 3. The control unit in the controller 3 has control means including a register capable of recognizing the slot 4 accommodating the battery 2 recharged. The control unit in the controller 3 controls indicator means to perform recharged battery indication according to the contents in the register. While the recharger 7 is provided for each slot 4 in this preferred embodiment, it may be used commonly for three slots 4, for example.

A ventilation fan 8 is provided on the back surface of the body 1a at an upper portion thereof. If the battery exchanging machine 1 is provided with air conditioning means, a large space for installing the air conditioning means is required and it becomes unsuitable for indoor use. From this point of view, this preferred embodiment employs the ventilation fan 8 to merely ventilate the inside air of the machine 1 to the outside air (the atmosphere at the installation site of the machine 1) without using any air conditioning means requiring a large installation space. As a result, the battery exchanging machine 1 can be made compact as will be hereinafter described.

The front cover 1b is provided with a plurality of laterally elongated windows 9 arranged in five columns corresponding to the arrangement of the slots 4. Each window 9 is provided with a door 10 for commonly covering the front openings of the six slots 4 in the same column. The door 10 may be formed from a transparent plastic plate, and it is openably supported at its upper end by a hinge 11. The lower edge portion of each window 9 is provided with a stopper 12 against which the back surface of the door 10 at its lower end portion comes into abutment when closing the door 10. The stopper 12 is preferably formed of an elastic material such as rubber, having a shock absorbing function. Further, each window 9 is provided with six indication lamps (e.g., LEDs) 13 respectively corresponding to the six slots 4 in the same column. When any one of the indication lamps 13 is on or flashed, a user is allowed to get access to the slot 4 and the battery 2 corresponding to this indication lamp 13. For convenience of illustration, the reference numerals 12 and 13 respectively denote the stoppers and the indication lamps for the slots 4 in the lowermost column in FIG. 26.

It is needless to say that the number of slots 4 for accommodating the batteries 2 is not limited to the above-mentioned number. Further, each window 9 may be made vertically elongated so as to cover the slots 4 in the same row. In this case, each door 10 also becomes vertically elongated, and is preferably supported by a hinge having a vertically extending pivot shaft. Further, the doors 10 may be used for only a required number of windows 9 according to the number of slots 4, and in the case that the number of slots 4 is small, the idle window or windows 9 may be closed by any covers. In the case that the number of slots 4 is increased, the closed window or windows 9 may be opened and the corresponding door or doors 10 may be provided accordingly.

A display panel 14 is formed on an upper portion of the front door 1b. The display panel 14 is provided with a power lamp 15, preparation indicator 16, operation procedure indicators 17, 18, and 19, card return lamp 20, and remaining accessible count indicator 21. Each of the preparation indicator 16 and the operation procedure indicators 17, 18, and 19 is composed of a display area in which a specific message is preliminarily written and a lamp for illuminating the display area. For example, a message of "IN PREPARATION" is displayed on the preparation indicator 16, a message of "INSERT BATTERY INTO THE SLOT INDICATED BY THE ON-LAMP" is displayed on the operation procedure indicator 17, a message of "INSERT CARD" is displayed on the operation procedure indicator 18, and a message of "TAKE BATTERY OUT OF THE SLOT INDICATED BY THE FLASHING LAMP" is displayed on the operation procedure indicator 19.

A card slot 22 for insertion of a prepaid card is also formed on the front cover 1b at a position on the right side of the window 9 in the uppermost column. The card slot 22 may be provided with an openable transparent plastic cover 22a.

Further, the battery exchanging machine 1 is supported by four feet 23 that are provided on the bottom thereof. The battery exchanging machine 1 has a height H of 120 cm, a depth D of 45 cm, and a breadth B of 72.5 cm. Of these dimensions, the height H is set preferably in consideration of easiness of loading and unloading of the batteries 2 from an ergonomic point of view, visibility of the machine 1 in the case of installing it in any store such as a convenience store, and appearance in the case of arranging the machine 1 with other article display stands. In these circumstances, the height H of the machine 1 is set preferably to 120±10 cm.

The operation of the battery exchanging machine 1 will now be described. In the case that no recharged batteries 2 are present in the machine 1, the preparation indicator 16 is on to stay showing the message of "IN PREPARATION." In the case that at least one recharged battery 2 is present, the preparation indicator 16 is turned off to make the message of "IN PREPARATION" disappear and instead the operation procedure indicator 17 is turned on to show the message of "INSERT BATTERY INTO THE SLOT INDICATED BY THE ON-LAMP." The indicator lamp or lamps 13 corresponding to the other empty slot or slots 4 is/are kept on. In the case that the empty slots 4 are present, all the corresponding indicator lamps 13 may be turned on, or one of the indicator lamps 13 corresponding to any selected one of the slots 4 may be turned on for the purpose of averaged use of the slots 4.

According to the present invention, the positions of the plural flanges on the bicycle frame are specific according to variations in kind of the bicycle frame, and the positions of the boss forming spaces where the bosses are selectively formed are also specific according to variations in the type of the bicycle frame. Accordingly, the power unit can be mounted at specific positions on the bicycle frame with specific attitudes according to the types of the bicycle frames. Thus, the power unit can be commonly used for different kinds of bicycle frames by simply after-fixing the flanges to the specific positions on an existing bicycle frame designed and manufactured for a usual bicycle.

The following effects can be attained according to the present invention. (1) All of the pedal sprocket, the stretched portion of the chain, and the drive sprocket can be covered with the single chain cover. Accordingly, it is possible to provide a motor-assisted bicycle having a chain cover capable of sufficiently exhibiting the function for the motor-assisted bicycle without an increase in the number of parts.

(2) Since the drive sprocket cover portion is integral with the chain cover, the overall shape and color of the chain cover including the drive sprocket cover portion can be made uniform, so that the appearance is not marred in spite of the presence of the drive sprocket cover portion. In particular, by making the drive sprocket cover portion have a circular shape, an accent can be given to the chain cover to thereby obtain a good design. Conversely, by making the drive sprocket cover portion with a dark color, the presence of the drive sprocket cover portion can be made inconspicuous to thereby obtain a design of natural feel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor-assisted bicycle having a power unit for inputting an assist power into a chain according to a depression force input from a pedal into said chain, comprising:
   a plurality of bicycle frames, each of said plurality of bicycle frames having a plurality of flanges for fixing said power unit thereon;
   said power unit having a plurality of boss forming spaces for forming bosses to be fixed to said plurality of bicycle frames, said plurality of boss forming spaces being first, second, and third boss forming spaces defined so that line segments connecting said first, second, and third boss forming spaces form a phantom triangle, said bosses being selectively formed in at least some of said boss forming spaces; and
   means for fixedly connecting some of said bosses of said power unit to said flanges,
   wherein said power unit is fixed to said plurality of bicycle frames separately from a pedal-powered crankshaft of said bicycle, and
   wherein said flanges on each of said plurality of bicycle frames are constructed differently from each other, and said bosses are selectively formed to accommodate said flanges.

2. The motor-assisted bicycle according to claim 1, wherein said bosses are formed in said first and second boss forming spaces and fixed to said flanges, and a sprocket mounted on an output shaft of said power unit meshes with said chain at a position on the front side of a crankshaft on which said pedal is mounted.

3. The motor-assisted bicycle according to claim 2, wherein a battery as a driving source for said power unit is fixed to a front side of a seat post of said bicycle.

4. The motor-assisted bicycle according to claim 1, wherein said bosses are formed in said first and third boss forming spaces and fixed to said flanges, and a sprocket mounted on an output shaft of said power unit meshes with said chain at a position on the rear side of a crankshaft on which said pedal is mounted.

5. The motor-assisted bicycle according to claim 1, wherein said chain being a single chain wrapped around a drive sprocket and a pedal sprocket for providing a driving force to a rear wheel.

6. A motor-assisted bicycle comprising:
   a plurality of bicycle frames, each of said plurality of bicycle frames having a plurality of flanges for fixing said power unit thereon;
   a power unit for inputting an assist power into a chain according to a depression force input from a pedal into said chain;
   boss forming spaces formed on said power unit for forming bosses to be fixed to said plurality of bicycle frames, said boss forming spaces being first, second, and third boss forming spaces defined so that line segments connecting said first, second, and third boss forming spaces form a phantom triangle, said bosses being selectively formed in at least some of said boss forming spaces; and
   means for fixedly connecting some of said bosses of said power unit to said flanges of said bicycle frame, respectively;
   wherein said power unit is fixed to said plurality of bicycle frames separately from a pedal powered crankshaft of said bicycle, and
   wherein said flanges on each of said plurality of bicycle frames are constructed differently from each other, and said bosses are selectively formed in predetermined locations for accommodating a plurality of bicycle frames for securing said power unit thereto.

7. The motor-assisted bicycle according to claim 6, wherein said bosses are formed in said first and second boss forming spaces and fixed to said flanges, and a sprocket mounted on an output shaft of said power unit meshes with said chain at a position on the front side of a crankshaft on which said pedal is mounted.

8. The motor-assisted bicycle according to claim 7, wherein a battery as a driving source for said power unit is fixed to a front side of a seat post of said bicycle.

9. The motor-assisted bicycle according to claim 6, herein said bosses are formed in said first and third boss forming spaces and fixed to said flanges, and a sprocket mounted on an output shaft of said power unit meshes with said chain at a position on the rear side of a crankshaft on which said pedal is mounted.

10. The motor-assisted bicycle according to claim 6, wherein said chain being a single chain wrapped around a drive sprocket, a pedal sprocket, and a driven sprocket on a rear axle of said bicycle.

11. A motor-assisted bicycle having a power unit for inputting an assist power into a chain according to a depression force input from a pedal into said chain, comprising:
    a plurality of bicycle frames, each of said plurality of bicycle frames having a plurality of flanges for fixing said power unit thereon;
    said power unit having a plurality of boss forming spaces for forming bosses to be fixed to said plurality of bicycle frames, said bosses being selectively formed in at least some of said boss forming spaces; and
    means for fixedly connecting some of said bosses of said power unit to said flanges,
    wherein said power unit is fixed to said plurality of bicycle frames separately from a pedal-powered crankshaft of said bicycle,
    wherein said flanges on each of said plurality of bicycle frames are constructed differently from each other, and said bosses are selectively formed to accommodate said flanges, and
    wherein a battery as a driving source for said power unit is fixed to a front side of a seat post of said bicycle.

12. The motor-assisted bicycle according to claim 11, wherein said boss forming spaces are first, second, and third boss forming spaces defined so that line segments connecting said first, second, and third boss forming spaces form a phantom triangle.

13. The motor-assisted bicycle according to claim 12, wherein said bosses are formed in said first and second boss forming spaces and fixed to said flanges, and a sprocket mounted on an output shaft of said power unit meshes with said chain at a position on the front side of a crankshaft on which said pedal is mounted.

14. The motor-assisted bicycle according to claim 11, wherein said chain being a single chain wrapped around a drive sprocket, a pedal sprocket, and a driven sprocket on a rear axle of said bicycle.

* * * * *